US008662029B2

(12) United States Patent
Simpson et al.

(10) Patent No.: US 8,662,029 B2
(45) Date of Patent: Mar. 4, 2014

(54) HIGH-EFFICIENCY LINEAR COMBUSTION ENGINE

(75) Inventors: Adam Simpson, San Francisco, CA (US); Shannon Miller, Belmont, CA (US); Matt Svrcek, Redwood City, CA (US)

(73) Assignee: EtaGen, Inc., Menlo Park, CA (US)

( * ) Notice: Subject to any disclaimer, the term of this patent is extended or adjusted under 35 U.S.C. 154(b) by 0 days.

(21) Appl. No.: 13/298,206

(22) Filed: Nov. 16, 2011

(65) Prior Publication Data

US 2012/0125291 A1    May 24, 2012

Related U.S. Application Data

(63) Continuation-in-part of application No. 13/102,916, filed on May 6, 2011, now Pat. No. 8,453,612, which is a continuation-in-part of application No. 12/953,270, filed on Nov. 23, 2010, which is a continuation-in-part of application No. 12/953,277, filed on Nov. 23, 2010, now Pat. No. 8,413,617.

(51) Int. Cl.
*F02B 71/00* (2006.01)

(52) U.S. Cl.
USPC ............... 123/46 E; 123/46 A; 123/46 B

(58) Field of Classification Search
USPC .................... 123/46 E, 46 A, 46 B
See application file for complete search history.

(56) References Cited

U.S. PATENT DOCUMENTS

| | | | |
|---|---|---|---|
| 2,567,042 A * | 9/1951 | Wemp | 477/136 |
| 2,814,551 A * | 11/1957 | Broeze et al. | 60/525 |
| 3,170,406 A | 2/1965 | Robertson | |
| 3,225,617 A * | 12/1965 | Young | 477/43 |
| 4,154,200 A | 5/1979 | Jarret et al. | |
| 4,308,720 A * | 1/1982 | Brandstadter | 60/595 |
| 4,480,599 A | 11/1984 | Allais | |

(Continued)

FOREIGN PATENT DOCUMENTS

| | | | |
|---|---|---|---|
| DE | 102007056527 A1 | 5/2009 | |
| JP | 2002322946 | 11/2002 | |

(Continued)

OTHER PUBLICATIONS

R. Mikalsen; "A Review of Free-Piston Engine History and Application," Applied Thermal Engineering 27 (2007); pp. 2339-2352.

(Continued)

*Primary Examiner* — Noah Kamen
*Assistant Examiner* — Long T Tran
(74) *Attorney, Agent, or Firm* — Shvarts & Leiz LLP

(57) ABSTRACT

Various embodiments of the present invention are directed toward a linear combustion engine, comprising: a cylinder having a cylinder wall and a pair of ends, the cylinder including a combustion section disposed in a center portion of the cylinder; a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a gas section; and a pair of linear electromagnetic machines adapted to directly convert kinetic energy of the piston assembly into electrical energy, and adapted to directly convert electrical energy into kinetic energy of the piston assembly for providing compression work during the compression stroke.

43 Claims, 12 Drawing Sheets

(56) References Cited

U.S. PATENT DOCUMENTS

| | | | |
|---|---|---|---|
| 4,876,991 A * | 10/1989 | Galitello, Jr. | 123/46 E |
| 4,924,956 A | 5/1990 | Deng et al. | |
| 5,030,182 A * | 7/1991 | Frost | 475/204 |
| 5,775,273 A | 7/1998 | Beale | |
| 5,832,880 A | 11/1998 | Dickey | |
| 6,170,442 B1 * | 1/2001 | Beale | 123/46 B |
| 6,199,519 B1 * | 3/2001 | Van Blarigan | 123/46 R |
| 6,276,313 B1 | 8/2001 | Yang et al. | |
| 6,314,924 B1 * | 11/2001 | Berlinger | 123/46 R |
| 6,374,924 B1 | 4/2002 | Hanton et al. | |
| 6,415,745 B1 | 7/2002 | Hellen et al. | |
| 6,443,104 B1 | 9/2002 | Simescu et al. | |
| 6,532,916 B2 | 3/2003 | Kerrebrock | |
| 6,541,875 B1 | 4/2003 | Berlinger et al. | |
| 6,863,507 B1 | 3/2005 | Schaeffer et al. | |
| 6,945,202 B2 | 9/2005 | Kaneke et al. | |
| 7,082,909 B2 | 8/2006 | Graf et al. | |
| 7,104,227 B2 * | 9/2006 | Roberts | 123/55.7 |
| 7,258,085 B2 | 8/2007 | Niiyama et al. | |
| 7,469,664 B2 * | 12/2008 | Hofbauer et al. | 123/54.1 |
| 7,622,814 B2 | 11/2009 | Hyde et al. | |
| 7,640,910 B2 | 1/2010 | Lemke et al. | |
| 7,845,317 B2 * | 12/2010 | Max et al. | 123/46 E |
| 2005/0081804 A1 | 4/2005 | Graf et al. | |
| 2005/0284427 A1 * | 12/2005 | Barth | 123/46 R |
| 2006/0124083 A1 | 6/2006 | Niiyama et al. | |
| 2007/0169476 A1 | 7/2007 | Wood | |
| 2007/0215093 A1 | 9/2007 | Lemke et al. | |
| 2008/0036312 A1 | 2/2008 | Max et al. | |
| 2008/0271711 A1 * | 11/2008 | Cheeseman | 123/46 E |
| 2009/0031991 A1 * | 2/2009 | Lindgarde | 123/46 R |
| 2009/0125211 A1 | 5/2009 | Akihisa et al. | |
| 2009/0199821 A1 * | 8/2009 | Marchetti | 123/45 R |
| 2009/0308345 A1 | 12/2009 | Van den Brink | |
| 2010/0109343 A1 | 5/2010 | Lemke et al. | |

FOREIGN PATENT DOCUMENTS

| | | |
|---|---|---|
| JP | 2003343202 | 12/2003 |
| JP | 2008223657 | 9/2008 |
| JP | 2009216100 | 9/2009 |
| WO | 2010118738 A2 | 10/2010 |

OTHER PUBLICATIONS

Jeffrey G. Schreiber; "Development Considerations on the Free-Piston Stirling Power Convertor for Use in Space," NASA/TM (May 2007)-214805.

Peter Van Blarigan; "Free-Piston Engine," Transportation Energy Center; FY 2009 DOE Vehicle Technologies Program Annual Merit Review; May 19, 2009.

Seon-Young Kim; "Specific Power Estimations for Free-Piston Stirling Engines," American Institute of Aeronautics & Astronautics, (Jun. 2006); pp. 1-8.

Peter Van Blarigan; "Adanced Internal Combustion Engine Research," DOE Hydrogen Program Review NREL-CP-570-28890 (2000); pp. 1-19.

International Search Report and Written Opinion mailed on Mar. 28, 2012 for Application No. PCT/US2011/061145; 12 pages.

International Search Report and Written Opinion mailed on Apr. 18, 2012 for Application No. PCT/US2011/066214; 16 pages.

International Preliminary Report on Patentability for Application No. PCT/US2011/061145, issued May 28, 2013.

* cited by examiner

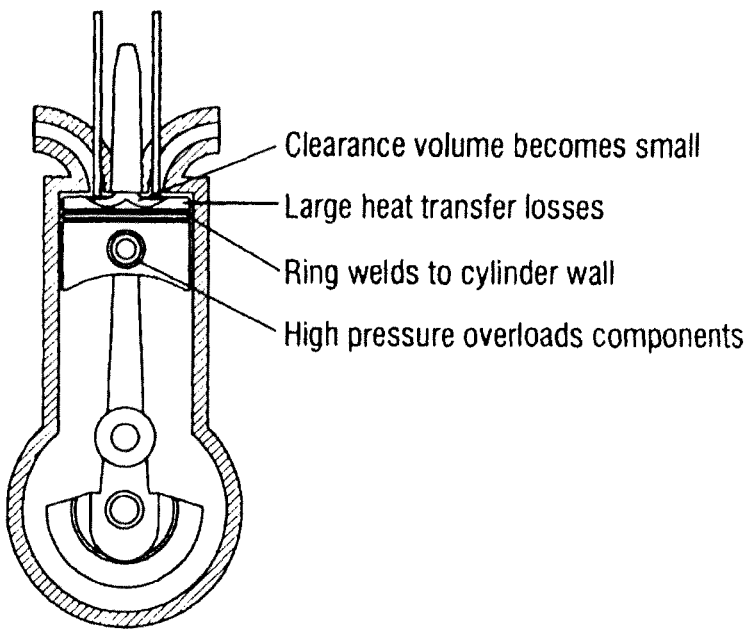
FIG. 3
*(Prior Art)*
Two Opposed Pistons, Single Combustion Chamber
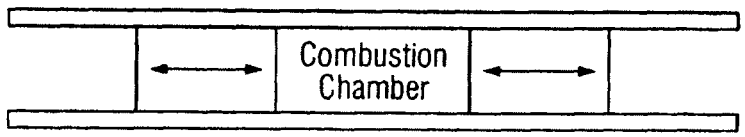
Single Piston, Dual Combustion Chambers
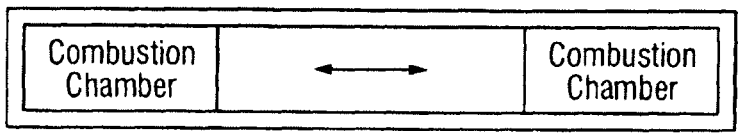
Single Piston, Single Combustion Chamber
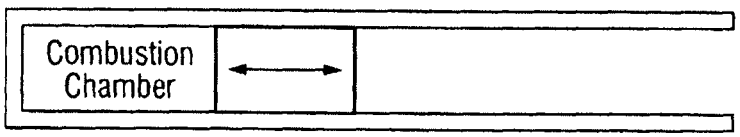
FIG. 4
*(Prior Art)*

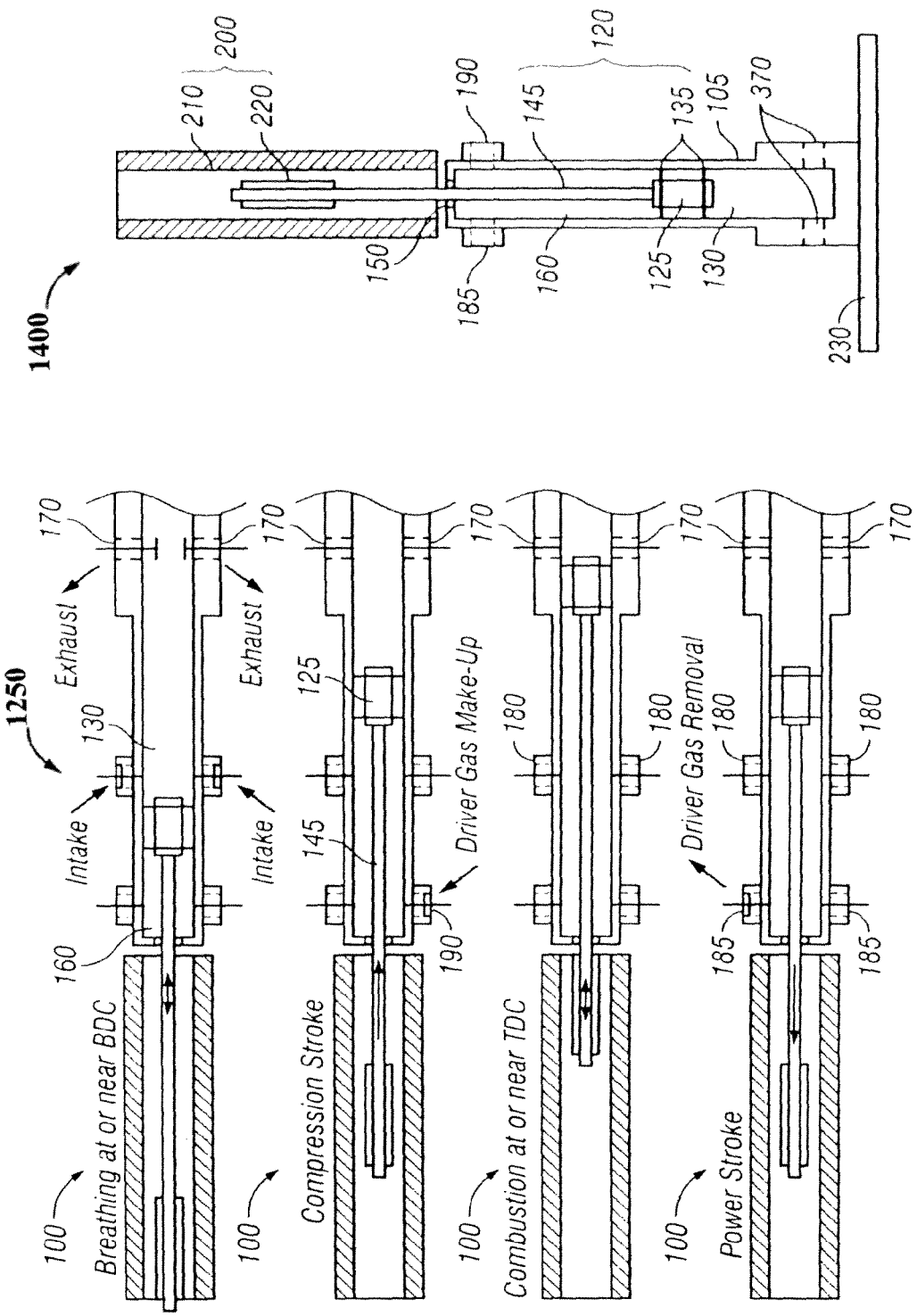

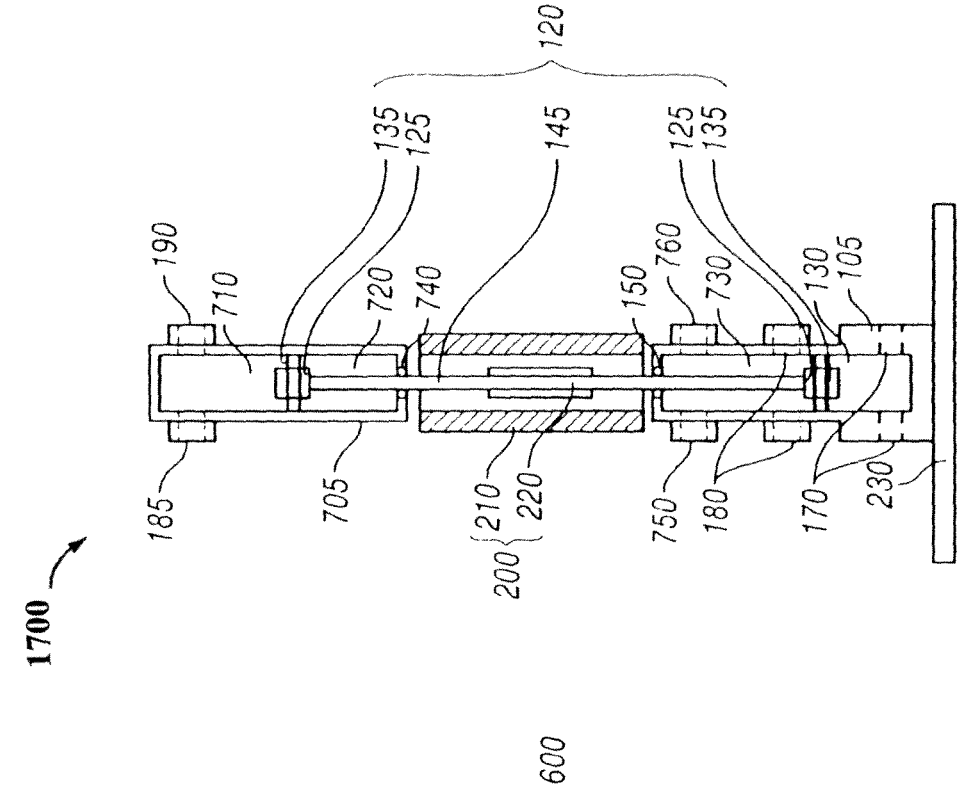
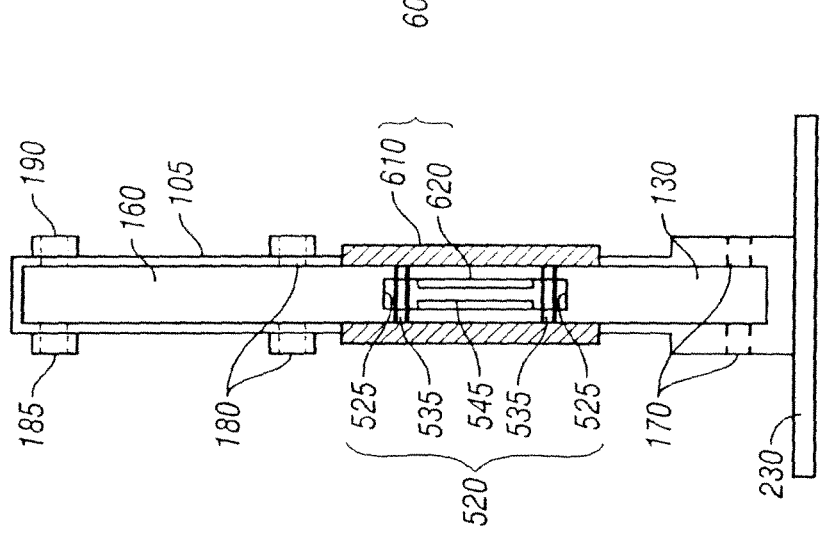
Fig. 16
Fig. 17

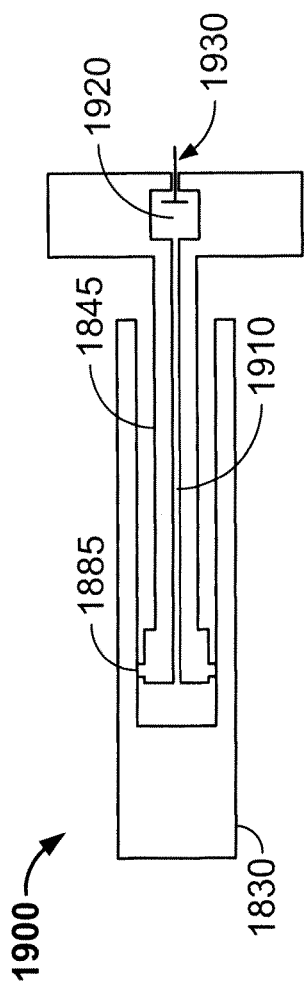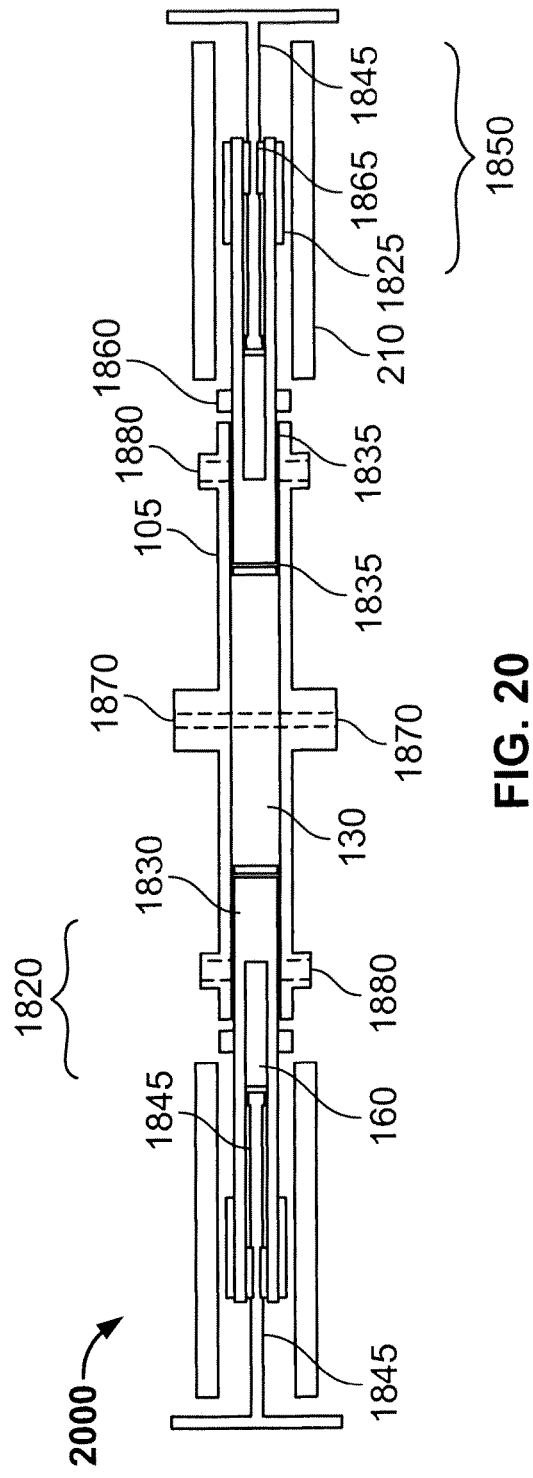

HIGH-EFFICIENCY LINEAR COMBUSTION ENGINE

REFERENCE TO RELATED APPLICATIONS

This application is a continuation-in-part of U.S. patent application Ser. No. 13/102,916 filed May 6, 2011, which is a continuation-in-part of U.S. patent application Ser. Nos. 12/953,277 and 12/953,270 filed Nov. 23, 2010, the contents of which are incorporated herein by reference in their entireties.

FIELD OF THE INVENTION

The present invention relates to high-efficiency linear combustion engines and, more particularly, some embodiments relate to high-efficiency linear combustion engines capable of reaching high compression/expansion ratios by utilizing a free-piston engine architecture in conjunction with a linear electromagnetic machine for work extraction and an innovative combustion control strategy.

DESCRIPTION OF THE RELATED ART

Engine power density and emission have improved over the past 30 years; however overall efficiency has remained relatively constant. It is well known in the engine community that increasing the geometric compression ratio of an engine increases the engine's theoretical efficiency limit. Additionally, increasing an engine's geometric expansion ratio such that it is larger than its compression ratio increases its theoretical efficiency limit even further. For the sake of brevity, "compression ratio" and "expansion ratio" is used to refer to "geometric compression ratio" and "geometric expansion ratio," respectively.

FIG. 1 (prior art) shows the theoretical efficiency limits of two cycles commonly used in internal combustion engines—Otto and Atkinson. In particular, FIG. 1 is a comparison between the ideal efficiencies of the Otto and Atkinson cycles as functions of compression ratio. The model assumptions include: (i) the pressure at bottom-dead-center ("BDC") is equal to one atmosphere; and (ii) premixed, stoichiometric, ideal gas methane and air including variable properties, dissociated products, and equilibrium during expansion.

As shown in FIG. 1, the theoretical efficiency limits for both cycles increase significantly with increasing compression ratio. The ideal Otto cycle is broken down into three steps: 1) isentropic compression, 2) adiabatic, constant volume combustion, and 3) isentropic expansion to the original volume at BDC. The expansion ratio for the Otto cycle is equal to its compression ratio. The ideal Atkinson cycle is also broken down into three steps: 1) isentropic compression, 2) adiabatic, constant volume combustion, and 3) isentropic expansion to the original BDC pressure (equal to one atmosphere in this example). The expansion ratio for the Atkinson cycle is always greater than its compression ratio, as shown in FIG. 1. Although the Atkinson cycle has a higher theoretical efficiency limit than the Otto cycle for a given compression ratio, it has a significantly lower energy density (power per mass). In actual applications, there is a trade-off between efficiency and energy density.

Well-designed/engineered engines in the market today typically achieve brake efficiencies between 70-80% of their theoretical efficiencies limits. The efficiencies of several commercially available engines are shown in FIG. 2 (prior art). Specifically, FIG. 2 is a comparison between the ideal Otto cycle efficiency limit and several commercially available engines in the market today. The model assumptions include premixed, stoichiometric, ideal gas propane and air including variable properties, dissociated products, and equilibrium during expansion. The effective compression ratio is defined as the ratio of the density of the gas at top-dead-center ("TDC") to the density of the gas at BDC. The effective compression ratio provides a means to compare boosted engines to naturally aspirated engines on a level playing field. In order for a similarly well-designed engine to have brake efficiencies above 50% (i.e., at least 70% of its theoretical efficiency) an engine operating under the Otto cycle must have a compression greater than 102 and an engine operating under the Atkinson cycle must have a compression ratio greater than 14, which corresponds to an expansion ratio of 54, as illustrated in FIG. 1.

It is difficult to reach high compression/expansion ratios (above 30) in conventional, slider-crank, reciprocating engines ("conventional engines") because of the inherent architecture of such engines. A diagram illustrating the architecture of conventional engines and issues that limit them from going to high compression ratios. is shown in FIG. 3 (prior art). Typical internal combustion ("IC") engines have bore-to-stroke ratios between 0.5-1.2 and compression ratios between 8-24. (Heywood, J. (1988). *Internal Combustion Engine Fundamentals*. McGraw-Hill). As an engine's compression ratio is increased while maintaining the same bore-to-stroke ratio, the surface-to-volume ratio at top-dead-center (TDC) increases, the temperature increases, and the pressure increases. This has three major consequences: 1) heat transfer from the combustion chamber increases, 2) combustion phasing become difficult, and 3) friction and mechanical losses increase. Heat transfer increases because the thermal boundary layer becomes a larger fraction of the overall volume (i.e., the aspect ratio at TDC gets smaller). The aspect ratio is defined as the ratio of the bore diameter to the length of the combustion chamber. Combustion phasing and achieving complete combustion is difficult because of the small volume realized at TDC. Increased combustion chamber pressure directly translates to increased forces. These large forces can overload both the mechanical linkages and piston rings.

While free-piston internal combustion engines are not new, they have typically not been utilized or developed for achieving compression/expansion ratios greater than 30:1, with the exception of the work at Sandia National Laboratory. See, U.S. Pat. No. 6,199,519. There is a significant amount of literature and patents around free piston engines. However, the literature is directed toward free piston engines having short stroke lengths, and therefore having similar issues to reciprocating engines when going to high compression/expansion ratios—i.e., combustion control issues and large heat transfer losses. Free-piston engine configurations can be broken down into three categories: 1) two opposed pistons, single combustion chamber, 2) single piston, dual combustion chambers, and 3) single piston, single combustion chamber. A diagram of the three common free-piston engine configurations is shown in FIG. 4 (prior art). Single piston, dual combustion chamber, free-piston engine configurations are limited in compression ratio because the high forces experienced at high compression ratios are not balanced, which can cause mechanical instabilities.

As noted above, several free-piston engines have been proposed in the research and patent literature. Of the many proposed free-piston engines, there are only several that have been physically implemented (to our knowledge). Research by Mikalsen and Roskilly describes the free-piston engines at West Virginia University, Sandia National Laboratory, and the Royal Institute of Technology in Sweden. Mikalsen R., Roskilly A. P. *A review of free-piston engine history and applications. Applied Thermal Engineering*, 2007; 27:2339-2352. Other research efforts are reportedly ongoing at the Czech Technical University (http://www.lceproject.org/en/) INNAS BV in the Netherlands (http://www.innas.com/) and Pempek Systems in Australia (http://www.freepistonpower-.com/). All of the known, physically implemented free-piston engines have short stroke lengths, and therefore have similar issues to reciprocating engines when going to high compression/expansion ratios—i.e., combustion control issues and large heat transfer losses. Additionally, all of the engines except the prototype at Sandia National Laboratory (Aichlmayr, H. T., Van Blarigan, P. *Modeling and Experimental Characterization of a Permanent Magnet Linear Alternator for Free-Piston Engine Applications* ASME Energy Sustainability Conference San Francisco Calif., Jul. 19-23, 2009) and the prototype developed by OPOC (International Patent Application WO 03/078835) have single piston, dual combustion chamber configurations, and are therefore limited in compression ratio because the high forces experienced at high compression ratios are not balanced, which causes mechanical instabilities.

Given the inherent architecture limitations of conventional engines described above, several manufacturers have attempted, and are continuing attempts, to increase engine efficiency by going to high effective compression ratios through the use of turbo- or super-chargers. Boosting an engine via a turbo- or super-charger provides a means to achieve a high effective compression ratio while maintaining the same geometric compression ratio. Boosting an engine does not avoid the issues caused by the higher-than-normal pressures and forces experienced at and near TDC. Therefore, the forces can overload both the mechanical linkages within the engine (piston pin, piston rod, and crankshaft) causing mechanical failure and the pressure-energized rings causing increased friction, wear, or failure. Boosting an engine also typically leads to larger heat transfer losses because the time spent at or near TDC (i.e., when the temperatures are highest) is not reduced enough to account for the higher-than-normal temperatures experienced at or near TDC.

BRIEF SUMMARY OF EMBODIMENTS OF THE INVENTION

Various embodiments of the present invention provide high-efficiency linear combustion engines. Such embodiments remedy the issues that prohibit conventional engines from reaching high compression/expansion ratios by utilizing a free-piston engine architecture in conjunction with a linear electromagnetic machine for work extraction and an innovative combustion control strategy. The invention disclosed herein provides a means to increase the thermal efficiency of internal combustion engines to above 50% at scales suitable for distributed generation and/or hybrid-electric vehicles (5 kW-5 MW).

One embodiment of the invention is directed toward a linear combustion engine, comprising: a cylinder having a cylinder wall and a pair of ends, the cylinder including a combustion section disposed in a center portion of the cylinder; a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a hollow back section comprising a gas spring that directly provides at least some compression work during a compression stroke of the engine; and a pair of linear electromagnetic machines adapted to directly convert kinetic energy of the piston assembly into electrical energy, and adapted to directly convert electrical energy into kinetic energy of the piston assembly for providing compression work during the compression stroke; wherein the engine includes a variable expansion ratio greater than 50:1.

Another embodiment of the invention is directed toward a linear combustion engine, comprising: a cylinder having a cylinder wall and a combustion section disposed at one end of the cylinder; a piston assembly adapted to move linearly within the cylinder including a spring rod and a piston comprising a solid front section adjacent the combustion section and a hollow back section comprising a gas spring that directly provides at least some compression work during a compression stroke of the engine; and a linear electromagnetic machine adapted to directly convert kinetic energy of the piston assembly into electrical energy, and adapted to directly convert electrical energy into kinetic energy of the piston assembly for providing compression work during the compression stroke; wherein the engine includes a variable expansion ratio greater than 50:1.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 3 (prior art) is a diagram illustrating the architecture of conventional engines and issues that limit them from going to high compression ratios.

FIG. 4 (prior art) is a diagram of the three common free-piston engine configurations.

FIG. 13 is a diagram illustrating the two-stroke piston cycle of the single-piston, two-stroke, integrated gas springs engine of FIG. 12, in accordance with the principles of the invention.

FIG. 14 is a cross-sectional drawing illustrating a single-piston, four-stroke, integrated gas springs engine, in accordance with the principles of the invention.

FIG. 16 is a cross-sectional drawing illustrating another single-piston, two-stroke, single-combustion section, fully integrated gas springs and linear electromagnetic machine engine, in accordance with the principles of the invention.

FIG. 17 is a cross-sectional drawing illustrating another single-piston, two-stroke, single-combustion section, separated gas springs engine, in accordance with the principles of the invention.

FIG. 19 is a cross-sectional view illustrating an embodiment of a gas spring rod in accordance with the principles of the invention.

FIG. 20 is a cross-sectional view illustrating a two-piston, two-stroke version of the IIGS engine in accordance with an embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is generally directed toward high-efficiency linear combustion engines capable of reaching high compression/expansion ratios by utilizing a free-piston engine architecture in conjunction with a linear electromagnetic machine for work extraction and an innovative combustion control strategy.

Figure 1:
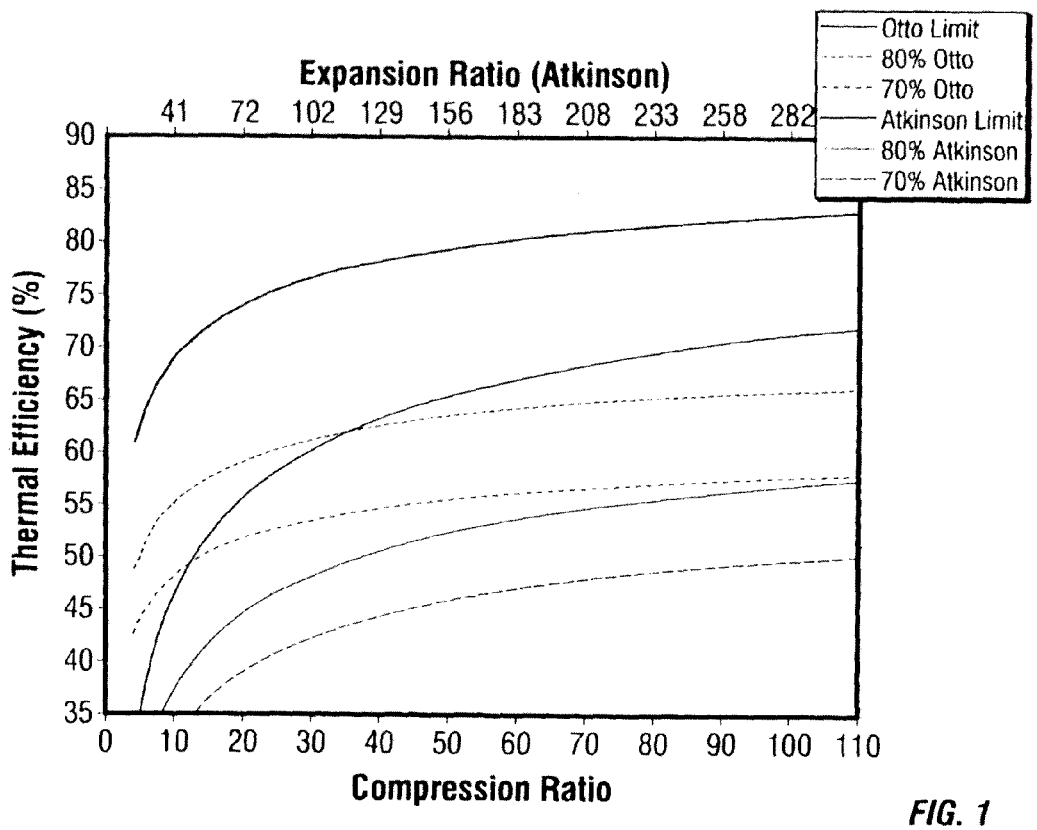
FIG. 1 (prior art) is a chart illustrating the theoretical efficiency limits of two cycles commonly used in internal combustion engines.
Figure 2:
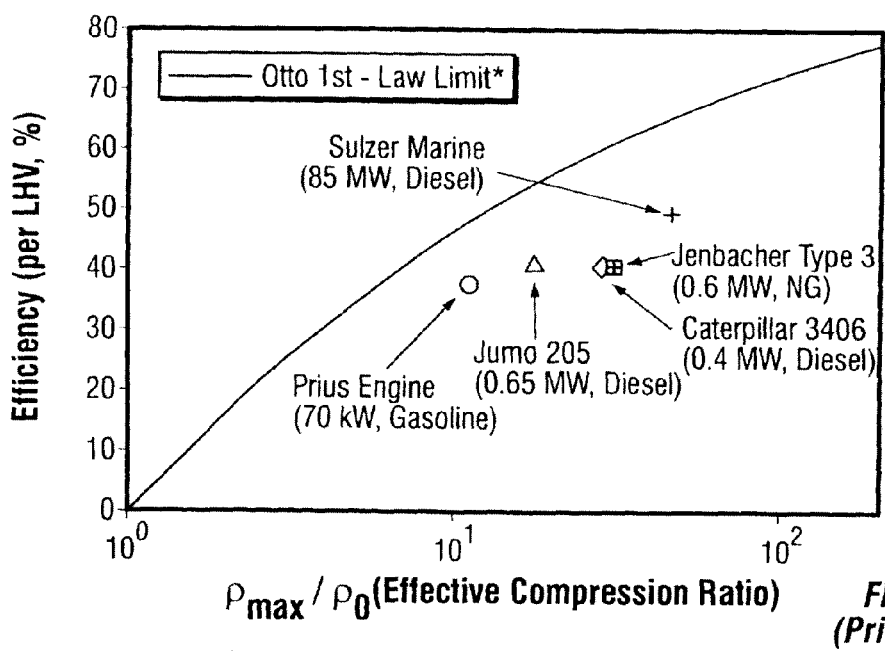
FIG. 2 (prior art) is a chart comparing the ideal Otto cycle efficiency limit and several commercially available engines in the market today.
Figure 5:
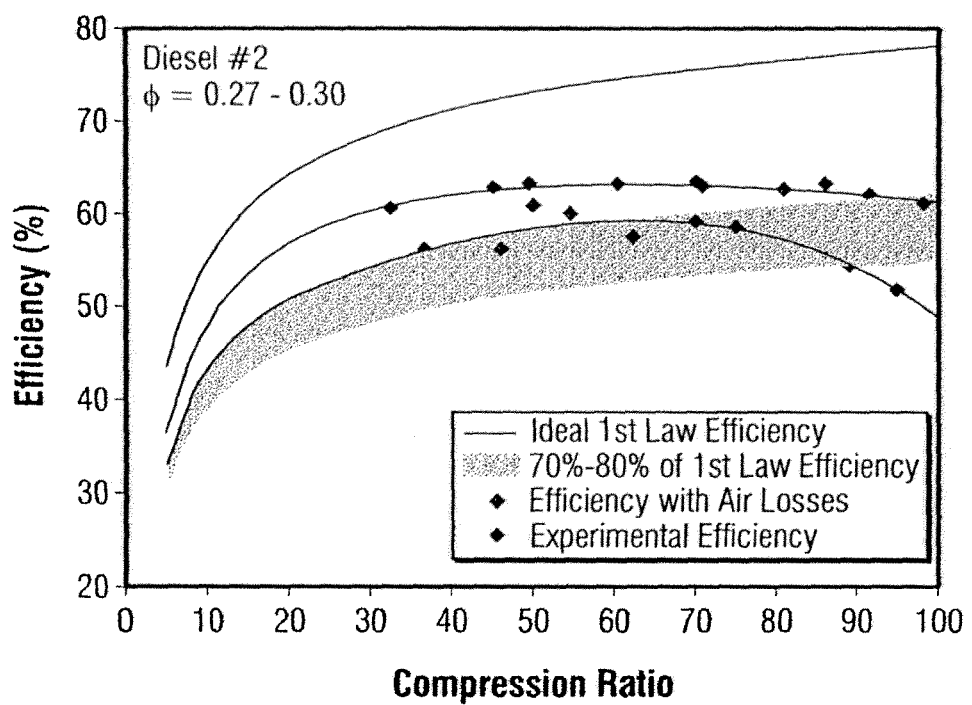
FIG. 5 is a chart illustrating a comparison between experimental data from the prototype at Stanford University and the ideal Otto cycle efficiency limit.

A single-shot, single-piston, prototype has been built and operated at Stanford University. This prototype demonstrates concept feasibility and achieves indicated-work efficiencies of 60%. A plot of certain experimental results is shown in FIG. 5. In particular, FIG. 5 is a chart illustrating a comparison between experimental data from the prototype at Stanford University and the ideal Otto cycle efficiency limit. The model assumptions are as follows: 0.3 equivalence ratio, diesel #2 and air including variable properties, dissociated products, and equilibrium during expansion.

Various embodiments of the invention are directed toward a free-piston, linear combustion engine characterized by a thermal efficiency greater than 50%. In at least one embodiment, the engine comprises: (i) at least one cylinder, (ii) at least one piston assembly per cylinder arranged for linear displacement within the cylinder, (iii) at least one linear electromagnetic machine that directly converts the kinetic energy of the piston assembly into electrical energy, and (iv) at least one gas section that provides at least some of the compression work during a compression stroke. Additionally, in some configurations, the internal combustion engine has the following physical characteristics: (i) a variable expansion ratio greater than 50:1, (ii) a variable compression ratio equal to or less than the expansion ratio, and (iii) a combustion section length at TDC between 0.2 and 4 inches. It should be noted, however, that further embodiments may include various combinations of the above-identified features and physical characteristics.

Figure 6:
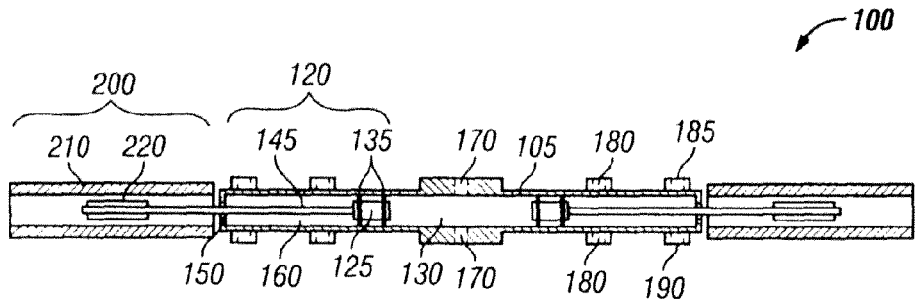
FIG. 6 is a cross-sectional drawing illustrating a two-piston, two-stroke, integrated gas springs embodiment of an internal combustion engine, in accordance with the principles of the invention.

FIG. 6 is a cross-sectional drawing illustrating a two-piston, two-stroke, integrated gas springs embodiment of an internal combustion engine 100. This free-piston, internal combustion engine 100 directly converts the chemical energy in a fuel into electrical energy via a pair of linear electromagnetic machines 200. As used herein, the term "fuel" refers to matter that reacts with an oxidizer. Such fuels include, but are not limited to: (i) hydrocarbon fuels such as natural gas, biogas, gasoline, diesel, and biodiesel; (ii) alcohol fuels such as ethanol, methanol, and butanol; and (iii) mixtures of any of the above. The engines described herein are suitable for both stationary power generation and portable power generation (e.g., for use in vehicles).

FIG. 6 illustrates one embodiment of a two-piston, two-stroke, integrated gas springs engine 100. In particular, the engine 100 comprises one cylinder 105 with two opposed piston assemblies 120 that meet at a combustion section 130 (or combustion chamber) in the center of the cylinder 105. The placement of the combustion section 130 in the center of the engine 100 balances the combustion forces. Each piston assembly 120 comprises a piston 125, piston seals 135, and a piston rod 145. The piston assemblies 120 are free to move linearly within the cylinder 105. The piston rods 145 move along bearings and are sealed by gas seals 150 that are fixed to the cylinder 105. In the illustrated embodiment, the gas seals 150 are piston rod seals. As used herein, the term "bearing" refers to any part of a machine on which another part moves, slides, or rotates, including but not limited to: slide bearings, flexure bearings, ball bearings, roller bearings, gas bearings, and/or magnetic bearings. Additionally, the term "surroundings" refers to the area outside of the cylinder 105, including but not limited to: the immediate environment, auxiliary piping, and/or auxiliary equipment.

With further reference to FIG. 6, the volume between the backside of the piston 125, piston rod 145, and the cylinder 105 is referred to herein as the driver section 160. The driver section 160 may also be referred to herein as the "gas section", "gas springs" or "gas springs section." Each driver section 160 is sealed from the surroundings and combustion section 130 by piston rod seal 150 and piston seals 135. In the illustrated embodiment, the gas in the driver section 160 acts a flywheel (i.e., a gas spring) during a cycle to provide at least some of the compression work during a compression stroke. Accordingly, some embodiments of the invention feature gas springs for providing work. Other embodiments include a highly efficient linear alternator operated as a motor, and do not require gas springs for generating compression work.

In some embodiments, in order to obtain high thermal efficiencies, the engine 100 has a variable expansion ratio greater than 50:1. In additional embodiments, the variable expansion ratio is greater than 75:1. In further embodiments, the variable expansion ratio is greater than 100:1. In addition, some embodiments feature a compression ratio equal to or less than the expansion ratio, and a combustion section length at TDC between 0.2-4 inches. As used herein, "combustion section length at TDC" is the distance between the front faces of the two pistons 125 at TDC.

The above specifications dictate that the engine 100 have a stroke length that is significantly longer than in conventional engines, wherein the term "stroke length" refers to the distance traveled by the each piston 125 between TDC and BDC. Combustion ignition can be achieved via compression ignition and/or spark ignition. Fuel can be directly injected into the combustion chamber 130 via fuel injectors ("direct injection") and/or mixed with air prior to and/or during air intake ("premixed injection"). The engine 100 can operate with lean, stoichiometric, or rich combustion using liquid and/or gaseous fuels.

With continued reference to FIG. 6, the cylinder 105 includes exhaust/injector ports 170, intake ports 180, driver gas removal ports 185, and driver gas make-up ports 190, for exchanging matter (solid, liquid, gas, or plasma) with the surroundings. As used herein, the term "port" includes any opening or set of openings (e.g., a porous material) which allows matter exchange between the inside of the cylinder 105 and its surroundings. Some embodiments do not require all of the ports depicted in FIG. 6. The number and types of ports depends on the engine configuration, injection strategy, and piston cycle (e.g., two- or four-stroke piston cycles). For this two-piston, two-stroke embodiment, exhaust/injector ports 170 allow exhaust gases and fluids to enter and leave the cylinder, intake ports 180 are for the intake of air and/or air/fuel mixtures, driver gas removal ports 185 are for the removal of driver gas, and driver gas make-up ports 190 are for the intake of make-up gas for the driver section 160. The location of the various ports is not necessarily fixed. For example, in the illustrated embodiment, exhaust/injector ports 170 are located substantially at the midpoint of the cylinder. However, these ports may alternatively be located away from the midpoint adjacent the intake ports 180.

The above-described ports may or may not be opened and closed via valves. The term "valve" may refer to any actuated flow controller or other actuated mechanism for selectively passing matter through an opening, including but not limited to: ball valves, plug valves, butterfly valves, choke valves, check valves, gate valves, leaf valves, piston valves, poppet valves, rotary valves, slide valves, solenoid valves, 2-way valves, or 3-way valves. Valves may be actuated by any means, including but not limited to: mechanical, electrical, magnetic, camshaft-driven, hydraulic, or pneumatic means. In most cases, ports are required for exhaust, driver gas removal, and driver gas make-up. In embodiments where direct injection is the desired ignition strategy, injector ports and air intake ports are also required. In embodiments where premixed compression ignition or premixed spark ignition is the desired combustion strategy, air/fuel intake ports may also be required. In embodiments where a hybrid premixed/direct injection strategy with compression ignition and/or spark ignition is the desired combustion strategy, injector ports and air/fuel intake ports may also be required. In all engine configurations, exhaust gas from a previous cycle can be mixed with the intake air or air/fuel mixture for a proceeding cycle. This process it is called exhaust gas recirculation (EGR) and can be utilized to moderate combustion timing and peak temperatures.

With further reference to FIG. 6, the engine 100 further comprises a pair of linear electromagnetic machines (LEMs) 200 for directly converting the kinetic energy of the piston assemblies 120 into electrical energy. Each LEM 200 is also capable of directly converting electrical energy into kinetic energy of the piston assembly 120 for providing compression work during a compression stroke. As illustrated, the LEM 200 comprises a stator 210 and a translator 220. Specifically, the translator 220 is attached to the piston rod 145 and moves linearly within the stator 210, which is stationary. The volume between the translator 220 and stator 210 is called the air gap. The LEM 200 may include any number of configurations. FIG. 6 shows one configuration in which the translator 220 is shorter than stator 210. However, the translator 220 could be longer than the stator 210, or they could be substantially the same length. In addition, the LEM 200 can be a permanent magnet machine, an induction machine, a switched reluctance machine, or some combination of the three. The stator 210 and translator 220 can each include magnets, coils, iron, or some combination thereof. Since the LEM 200 directly transforms the kinetic energy of the pistons to and from electrical energy (i.e., there are no mechanical linkages), the mechanical and frictional losses are minimal compared to conventional engine-generator configurations.

Figure 7:
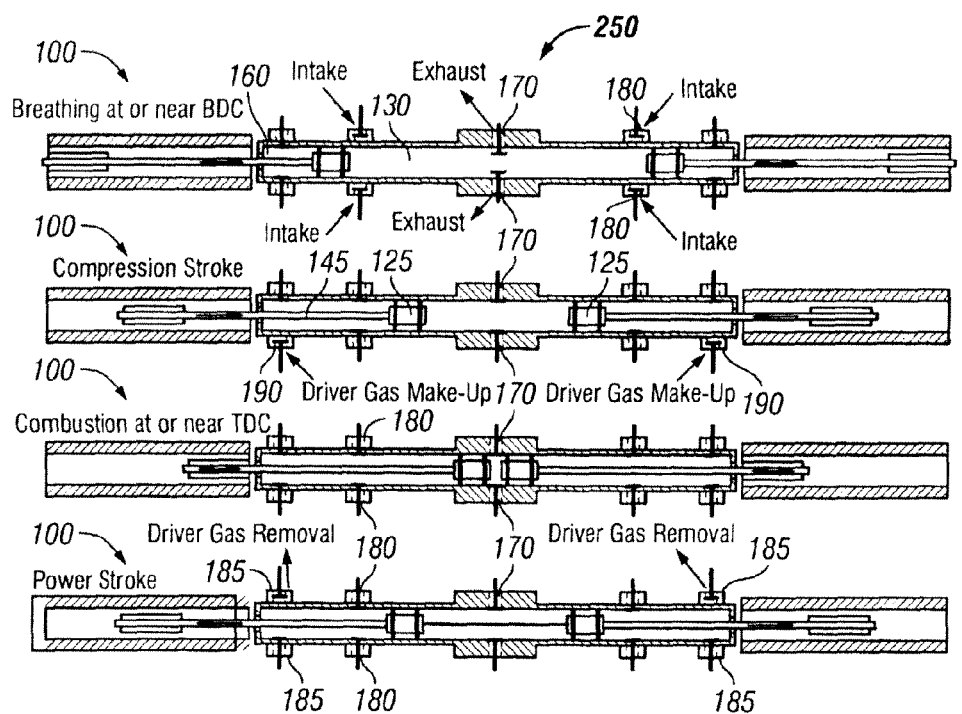
FIG. 7 is a diagram illustrating the two-stroke piston cycle of the two-piston integrated gas springs engine of FIG. 6.

The embodiment shown in FIG. 6 operates using a two-stroke piston cycle. A diagram illustrating the two-stroke piston cycle 250 of the two-piston integrated gas springs engine 100 of FIG. 6 is illustrated in FIG. 7. As used herein, the term "piston cycle" refers to any series of piston movements which begin and end with the piston 125 in substantially the same configuration. One common example is a four-stroke piston cycle, which comprises an intake stroke, a compression stroke, a power (expansion) stroke, and an exhaust stroke. Additional alternate strokes may form part of a piston cycle as described throughout this disclosure. A two-stroke piston cycle is characterized as having a power (expansion) stroke and a compression stroke.

As illustrated in FIG. 7, the engine exhausts combustion products (though exhaust ports 170) and intakes air or an air/fuel mixture or an air/fuel/combustion products mixture (through intake ports 180) near BDC between the power and compression strokes. This process may be referred to herein as "breathing" or "breathing at or near BDC." It will be appreciated by those of ordinary skill in the art that many other types of port and breathing configurations are possible without departing from the scope of the invention. When at or near BDC, and if the driver section is to be used to provide compression work, the pressure of the gas within the driver section 160 is greater than the pressure of the combustion section 130, which forces the pistons 125 inwards toward each other. The gas in the driver section 160 can be used to provide at least some of the energy required to perform a compression stroke. The LEM 200 may also provide some of the energy required to perform a compression stroke.

The amount of energy required to perform a compression stroke depends on the desired compression ratio, the pressure of the combustion section 130 at the beginning of the compression stroke, and the mass of the piston assembly 120. A compression stroke continues until combustion occurs, which is at a time when the velocity of the piston 125 is at or near zero. The point at which the velocities of the pistons 125 are equal to zero marks their TDC positions for that cycle. Combustion causes an increase in the temperature and pressure within the combustion section 130, which forces the piston 125 outward toward the LEM 200. During a power stroke, a portion of the kinetic energy of the piston assembly 120 is converted into electrical energy by the LEM 200 and another portion of the kinetic energy does compression work on the gas in the driver section 160. A power stroke continues until the velocities of the pistons 125 are zero, which marks their BDC positions for that cycle.

FIG. 7 illustrates one port configuration for breathing in which the intake ports 180 are in front of both pistons near BDC and the exhaust ports 170 are near TDC. There are various possible alternative port configurations, such as, but not limited to, locating the exhaust ports 170 in front of one piston 125 near BDC, and locating the intake ports 180 in front of the other piston 125 near BDC—allowing for what is called uni-flow scavenging, or uni-flow breathing. The opening and closing of the exhaust ports 170 and intake ports 180 are independently controlled. The location of the exhaust ports 170 and intake ports 180 can be chosen such that a range of compression ratios and/or expansion ratios are possible. The times in a cycle when the exhaust ports 170 and intake ports 180 are activated (opened and closed) can be adjusted during and/or between cycles to vary the compression ratio and/or expansion ratio and/or the amount of combustion product retained in the combustion section 130 at the beginning of a compression stroke. Retaining combustion gases in the combustion section 130 is called residual gas trapping (RGT) and can be utilized to moderate combustion timing and peak temperatures.

During the piston cycle, gas could potentially transfer past the piston seals 135 between the combustion section 130 and driver section 160. This gas transfer is referred to as "blowby." Blow-by gas could contain air and/or fuel and/or combustion products. The engine 100 is designed to manage blow-by gas by having at least two ports in each driver section 160—one port 185 for removing driver gas and the another port 190 for providing make-up driver gas. The removal of driver gas and the intake of make-up driver gas are independently controlled and occur in such a way to minimize losses and maximize efficiency.

FIG. 7 shows one strategy for exchanging driver gas in which the removal of driver gas occurs at some point during the expansion stroke and the intake of make-up driver gas occurs at some point during the compression stroke. The removal and intake of driver gas could also occur in the reverse order of strokes or during the same stroke. Removed driver gas can be used as part of the intake for the combustion section 130 during a proceeding combustion cycle. The amount of gas in the driver section 160 can be adjusted to vary the compression ratio and/or expansion ratio. The expansion ratio is defined as the ratio of the volume of combustion section 130 when the pistons 125 have zero velocity after the power stroke to the volume of the combustion section 130 when the pistons 125 have zero velocity after the compression stroke. The compression ratio is defined as the ratio of the volume of the combustion section 130 when the pressure within the combustion section 130 begins to increase due to the inward motion of the pistons 125 to the ratio of the volume of the combustion section 130 when the pistons 125 have zero velocity after the compression stroke.

Combustion is optimally controlled by moderating (e.g., cooling) the temperature of the gas within the combustion section 130 prior to combustion. Temperature control can be achieved by pre-cooling the combustion section intake gas and/or cooling the gas within the combustion section 130 during the compression stroke. Optimal combustion occurs when the combustion section 130 reaches the volume at which the thermal efficiency of the engine 100 is maximized. This volume is referred to as optimal volume, and it can occur before or after TDC. Depending on the combustion strategy (ignition and injection strategy), the combustion section intake gas could be air, an air/fuel mixture, or an air/fuel/combustion products mixture (where the combustion products are from EGR and/or recycled driver gas), and the gas within the combustion section 130 could be air, an air/fuel mixture, or an air/fuel/combustion products mixture (where the combustion products are from EGR and/or RGT and/or recycled driver gas).

When compression ignition is the desired ignition strategy, optimal combustion is achieved by moderating the temperature of the gas within the combustion section 130 such that it reaches its auto-ignition temperature at the optimal volume. When spark ignition is the desired ignition strategy, optimal combustion is achieved by moderating the temperature of the gas within the combustion section 130 such that it remains below its auto-ignition temperature before a spark fires at optimal volume. The spark is externally controlled to fire at the optimal volume. The combustion section intake gas can be pre-cooled by means of a refrigeration cycle. The gas within the combustion section 130 can be cooled during a compression stroke by injecting a liquid into the combustion section 130 which then vaporizes. The liquid can be water and/or another liquid such as, but not limited to, a fuel or a refrigerant. The liquid can be cooled prior to injection into the combustion section 130.

For a given engine geometry and exhaust and intake port locations, the power output from the engine 100 can be varied from cycle to cycle by varying the air/fuel ratio and/or the amount of combustion products in the combustion section 130 prior to combustion and/or the compression ratio and/or the expansion ratio. For a given air/fuel ratio in a cycle, the peak combustion temperature can be controlled by varying the amount of combustion products from a previous cycle that are present in the combustion section gas prior to combustion. Combustion products in the combustion section gas prior to combustion can come from EGR and/or RGT and/or recycling driver gas. Piston synchronization is achieved through a control strategy that uses information about the piston positions, piston velocities, combustion section composition, and cylinder pressures, to adjust the LEMs' and driver sections' operating characteristics.

The configuration of FIGS. 6 and 7 includes a single unit referred to as the engine 100 and defined by the cylinder 105, the piston assemblies 120 and the LEMs 200. However, many units can be placed in parallel, which could collectively be referred to as "the engine." Some embodiments of the invention are modular such that they can be arranged to operate in parallel to enable the scale of the engine to be increased as needed by the end user. Additionally, not all units need be the same size or operate under the same conditions (e.g., frequency, stoichiometry, or breathing). When the units are operated in parallel, there exists the potential for integration between the engines, such as, but not limited to, gas exchange between the units and/or feedback between the units' LEMs 200.

The free-piston architecture allows for large and variable compression and expansion ratios while maintaining sufficiently large volume at TDC to minimize heat transfer and achieve adequate combustion. In addition, the pistons spend less time at and near TDC than they would if they were mechanically linked to a crankshaft. This helps to minimize heat transfer (and maximize efficiency) because less time is spent at the highest temperatures. Furthermore, since the free-piston architecture does not have mechanical linkages, the mechanical and frictional losses are minimal compared to conventional engines. Together, the large and variable compression and expansion ratios, the sufficiently large volume at TDC, the direct conversion of kinetic energy to electrical energy by the LEM 200, the inherently short time spent at and near TDC, and the ability to control combustion, enable the engine 100 to achieve thermal efficiencies greater than 50%.

During operation, the losses within the engine 100 include: combustion losses, heat transfer losses, electricity conversion losses, frictional losses, and blow-by losses. In some embodiments of the invention, combustion losses are minimized by performing combustion at high internal energy states, which is achieved by having the ability to reach high compression ratios while moderating combustion section temperatures. Heat transfer losses are minimized by having a sufficiently large volume at and near when combustion occurs such that the thermal boundary layer is a small fraction of the volume. Heat transfer losses are also minimized by spending less time at high temperature using a free-piston profile rather than a slider-crank profile. Frictional losses are minimized because there are no mechanical linkages. Blow-by losses are minimized by having well-designed piston seals and using driver gas that contains unburned fuel as part of the intake for the next combustion cycle.

As stated, the embodiment described above with respect to FIGS. 6 and 7 comprises a two-piston, single-combustion section, two-stroke internal combustion engine 100. Described below, and illustrated in the corresponding figures, are several alternative embodiments. These embodiments are not meant to be limiting. As would be appreciated by those of ordinary skill in the art, various modifications and alternative configurations may be utilized, and other changes may be made, without departing from the scope of the invention. Unless otherwise stated, the physical and operational characteristics of the embodiments described below are similar to those described in the embodiment of FIGS. 6 and 7, and like elements have been labeled accordingly. Furthermore, all embodiments may be configured in parallel (i.e., in multiple-unit configurations for scaling up) as set forth above.

Figure 8:
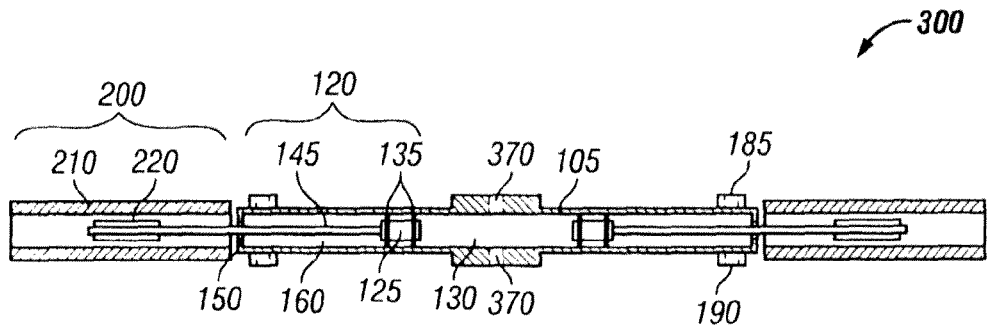
FIG. 8 is a cross-sectional drawing illustrating a two-piston, four-stroke, integrated gas springs embodiment of an internal combustion engine, in accordance with the principles of the invention.

FIG. 8 illustrates a four-stroke embodiment of the invention comprising a two-piston, four-stroke, integrated gas springs engine 300. The main physical difference between the four-stroke engine 300 of FIG. 8 and the two-stroke engine 100 of FIG. 6 involves the location of the ports. In particular, in the four-stroke engine 300, the exhaust, injector, and intake ports 370 are located at and/or near the midpoint of the cylinder 105 between the two pistons 125.

Figure 9:
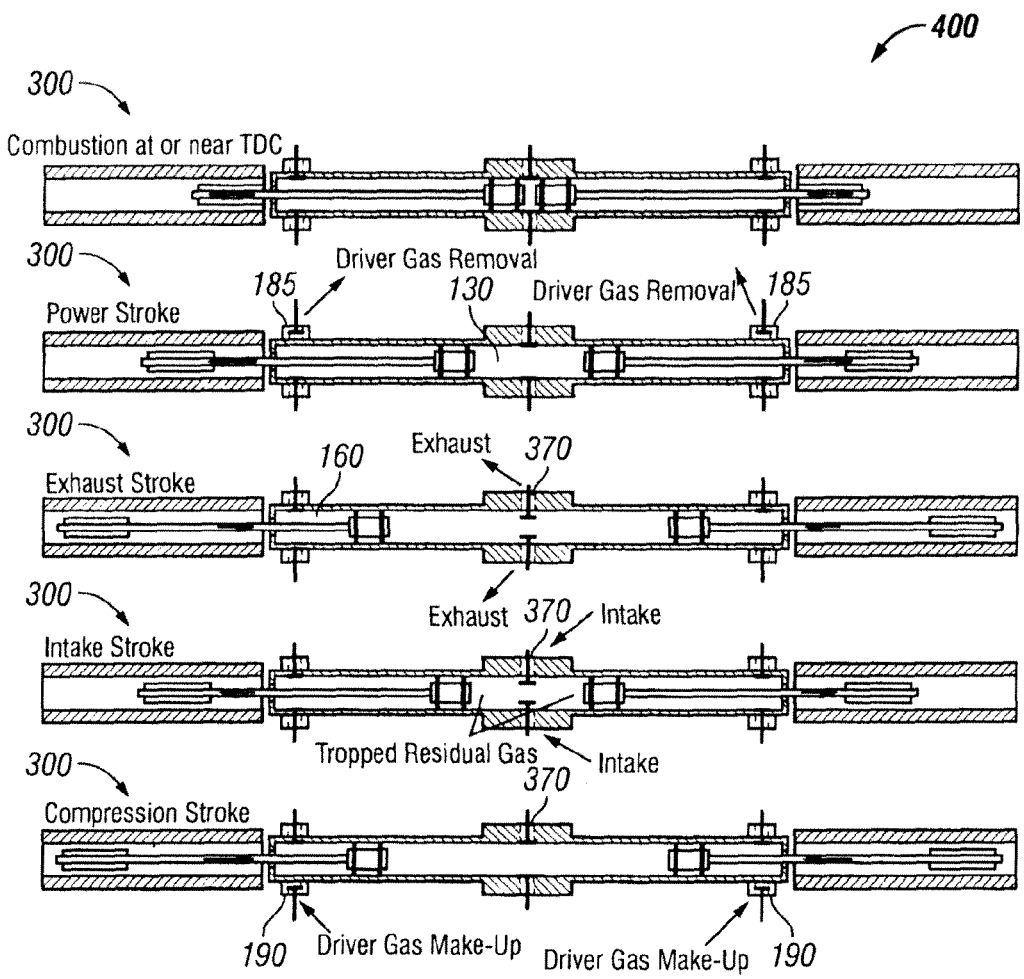
FIG. 9 is a diagram illustrating the four-stroke piston cycle of the two-piston integrated gas springs engine of FIG. 8, in accordance with the principles of the invention.

FIG. 9 illustrates the four-stroke piston cycle 400 for the two-piston integrated gas springs engine 300 of FIG. 8. A four-stroke piston cycle is characterized as having a power (expansion) stroke, an exhaust stroke, an intake stroke, and a compression stroke. A power stroke begins following combustion, which occurs at the optimal volume, and continues until the velocities of the pistons 125 are zero, which marks their power-stroke BDC positions for that cycle.

During a power stroke, a portion of the kinetic energy of the piston assemblies 120 is converted into electrical energy by the LEM 200, and another portion of the kinetic energy does compression work on the gas in the driver section 160. When at and near the power-stroke BDC, and if the driver section is to provide at least some of the compression work, the pressure of the gas in the driver section 160 is greater than the pressure of the gas in the combustion section 130, which forces the pistons 125 inwards toward the midpoint of the cylinder 105. In the illustrated embodiment, the gas in the driver section 160 can be used to provide at least some of the energy required to perform an exhaust stroke. In some cases, the LEM 200 may also provide some of the energy required to perform an exhaust stroke. Exhaust ports 370 open at some point at or near the power-stroke BDC, which can be before or after an exhaust stroke begins. An exhaust stroke continues until the velocities of the pistons 125 are zero, which marks their exhaust-stroke TDC positions for that cycle. Exhaust ports 370 close at some point before the pistons 125 reach their exhaust-stroke TDC positions. Therefore, at least some combustion products remain in the combustion section 130. This process is referred to as residual gas trapping.

With further reference to FIG. 9, at and near the exhaust-stroke TDC, the pressure of the combustion section 130 is greater than the pressure of the driver section 160, which forces the pistons 125 outwards. The trapped residual gas acts a gas spring to provide at least some of the energy required to perform an intake stroke. The LEM 200 may also provide some of the energy required to perform an intake stroke. Intake ports 370 open at some point during the intake stroke after the pressure within the combustion section 130 is below the pressure of the intake gas. An intake stroke continues until the velocities of the pistons 125 are zero, which marks their intake-stroke BDC positions for that cycle. The intake-stroke BDC positions for a given cycle do not necessarily have to be the same as the power-stroke BDC positions. Intake ports 370 close at some point at or near intake-stroke BDC. A compression stroke continues until combustion occurs, which is at a time when the velocities of the pistons 125 are at or near zero. The positions of the pistons 125 at which their velocities equal zero mark their compression-stroke TDC positions for that cycle. At and near the compression-stroke TDC, the pressure of the gas in the driver section 160 is greater than the pressure of the gas in the combustion section 130, which forces the pistons 125 inwards. The gas in the driver section 160 is used to provide at least some of the energy required to perform a compression stroke. The LEM 200 may also provide some of the energy required to perform a compression stroke.

FIG. 9 shows one strategy for exchanging driver gas in which the removal of driver gas occurs at some point during the expansion stroke and the intake of make-up driver gas occurs at some point during the compression stroke. As in the two-stroke embodiment, the removal and intake of driver gas could also occur in the reverse order of strokes or during the same stroke. However, since the four-stroke embodiment has a separate exhaust stroke, which requires less energy to perform than a compression stroke, regulating the amount of air in the driver section 160 may require a different approach, depending on how much the LEM 200 is used to provide and extract energy during the four strokes.

Figure 10:
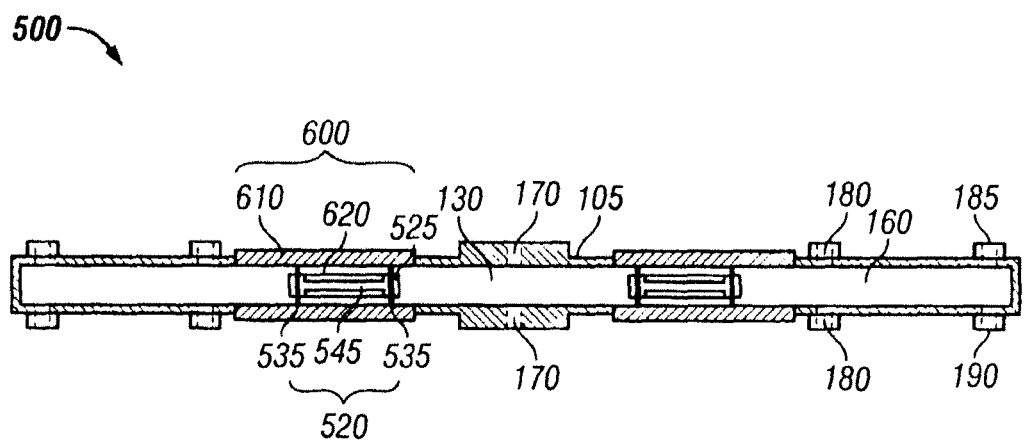
FIG. 10 is a cross-sectional drawing illustrating an alternative two-piston, two-stroke, single-combustion section, fully integrated gas springs and linear electromagnetic machine engine, in accordance with the principles of the invention.

FIG. 10 illustrates a second two-piston, two-stroke, fully gas springs and integrated linear electromagnetic machine embodiment of an internal combustion engine 500. Similar to the engine 100 of FIG. 10 engine 500 comprises a cylinder 105, two opposed piston assemblies 520, and a combustion section 130 located in the center of the cylinder 105. In the illustrated configuration, each piston assembly 520 comprises two pistons 525, piston seals 535, and a piston rod 545. Unlike previous embodiments, the piston assemblies 520 and translators 620 are completely located within the cylinder, and the LEM 600 (including stator 610) is disposed around the outside perimeter of the cylinder 105. The piston assemblies 520 are free to move linearly within the cylinder 105. The cylinder 105 further includes exhaust/injector ports 170, intake ports 180, driver gas removal ports 185, and driver gas make-up ports 190. With further reference to FIG. 10, this embodiment can operate using a two- or four-stroke piston cycle using the same methodology set forth above with respect to FIGS. 7, and 9.

Figure 11:
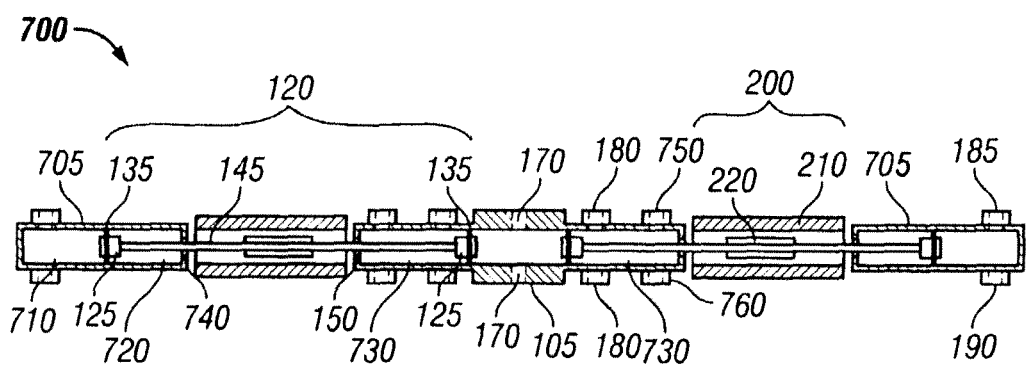
FIG. 11 is a cross-sectional drawing illustrating an alternative two-piston, two-stroke, single-combustion section, separated gas springs engine, in accordance with the principles of the invention.

FIG. 11 illustrates a third two-piston, two-stroke, single-combustion section, separated gas springs embodiment of an internal combustion engine 700. Similar to the engine 100 of FIG. 6, engine 700 comprises a main cylinder 105, two opposed piston assemblies 120, and a combustion section 130 located in the center of the cylinder 705. However, the illustrated engine 700 has certain physical differences when compared with engine 100. Specifically, engine 700 includes a pair of outer cylinders 705 that contain additional pistons 135, and the LEMs 200 are disposed between the main cylinder 105 and the outer cylinders 705. Each outer cylinder 705 includes a driver section 710 located between the piston 125 and the distal end of the cylinder 705 and a driver back section 720 disposed between the piston 125 and the proximal end of cylinder 705. Additionally, cylinder 105 includes a pair of combustion back sections 730 disposed between the pistons 125 and the distal ends of the cylinder 105. The driver back section 720 and combustion back section 730 are maintained at or near atmospheric pressure. As such, the driver back section 720 is not sealed (i.e., linear bearing 740 is provided with no gas seal), whereas the combustion back section 730 is sealed (i.e., via seal 150), but has ports for removal of blow-by gas (i.e., blow-by removal port 750) and for make-up gas (i.e., make-up air port 760). In the illustrated configuration, each piston assembly 120 comprises two pistons 125, piston seals 135, and a piston rod 145. The piston assemblies 120 are free to move linearly between the main cylinder 105 and the outer cylinders 705, as depicted in FIG. 11. The piston rods 145 move along bearings and are sealed by gas seals 150 that are fixed to the main cylinder 105. The cylinder 105 further includes exhaust/injector ports 170 and intake ports 180. However, the driver gas removal ports 185 and driver gas make-up ports 190 are located on a pair of outer cylinders 705 that contain one of the two pistons 125 of each piston assembly 120. With further reference to FIG. 11, this embodiment can operate using a two- or four-stroke piston cycle using the same methodology set forth above with respect to FIGS. 7 and 9.

Figure 12:
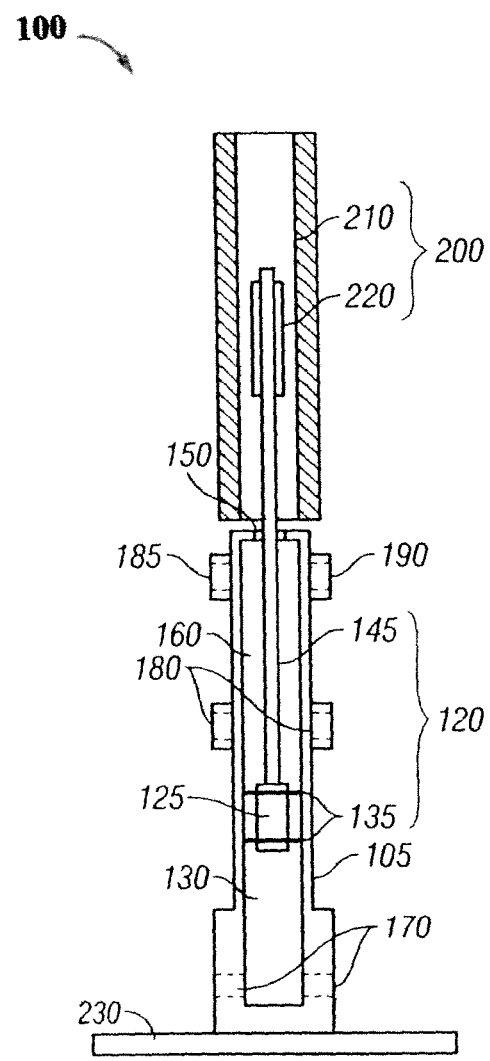
FIG. 12 is a cross-sectional drawing illustrating a single-piston, two-stroke, integrated gas springs engine, in accordance with the principles of the invention.

FIG. 12 illustrates one embodiment of a single-piston, two-stroke, integrated gas springs engine 1000. In particular, the engine 1000 comprises a vertically disposed cylinder 105 with piston assembly 120 dimensioned to move within the cylinder 105 in response to reactions within combustion section 130 (or combustion chamber) near the bottom end of the cylinder 105. An impact plate 230 is provided at the bottom end of the vertically disposed cylinder to provide stability and impact resistance during combustion. Piston assembly 120 comprises a piston 125, piston seals 135, and a piston rod 145. The piston assembly 120 is free to move linearly within the cylinder 105. The piston rod 145 moves along bearings and is sealed by gas seals 150 that are fixed to the cylinder 105. In the illustrated embodiment, the gas seals 150 are piston rod seals.

With further reference to FIG. 12, the volume between the backside of the piston 125, piston rod 145, and the cylinder 105 is referred to herein as the driver section 160. The driver section 160 may also be referred to herein as the "gas springs" or "gas springs section." Driver section 160 is sealed from the surroundings and combustion section 130 by piston rod seal 150 and piston seals 135. In the illustrated embodiment, the gas in the driver section 160 acts a flywheel (i.e., a gas spring) during a cycle to provide at least some of the compression work during a compression stroke. Accordingly, some embodiments of the invention feature gas springs for providing work. Other embodiments include a highly efficient linear alternator operated as a motor, and do not require gas springs for generating compression work.

In some embodiments, in order to obtain high thermal efficiencies, the engine 1000 has a variable expansion ratio greater than 50:1. In additional embodiments, the variable expansion ratio is greater than 75:1. In further embodiments, the variable expansion ratio is greater than 100:1. In addition, some embodiments feature a compression ratio equal to or less than the expansion ratio, and a combustion section length at TDC between 0.1-2 inches. As used herein, "combustion section length at TDC" is the distance between the combustion section head and front face of the piston 125.

The above specifications dictate that the engine 1000 have a stroke length that is significantly longer than in conventional engines, wherein the term "stroke length" refers to the distance traveled by the piston 125 between TDC and BDC. The stroke is the distance traveled by the piston between TDC and BDC. Combustion ignition can be achieved via compression ignition and/or spark ignition. Fuel can be directly injected into the combustion chamber 130 via fuel injectors ("direct injection") and/or mixed with air prior to and/or during air intake ("premixed injection"). The engine 1000 can operate with lean, stoichiometric, or rich combustion using liquid and/or gaseous fuels.

With continued reference to FIG. 12, the cylinder 105 includes exhaust/injector ports 170, intake ports 180, driver gas removal port 185, and driver gas make-up port 190, for exchanging matter (solid, liquid, gas, or plasma) with the surroundings. As used herein, the term "port" includes any opening or set of openings (e.g., a porous material) which allows matter exchange between the inside of the cylinder 105 and its surroundings. Some embodiments do not require all of the ports depicted in FIG. 12. The number and types of ports depends on the engine configuration, injection strategy, and piston cycle (e.g., two- or four-stroke piston cycles). For this single-piston, two-stroke embodiment, exhaust/injector ports 170 allow exhaust gases and fluids to enter and leave the cylinder, intake ports 180 are for the intake of air and/or air/fuel mixtures, driver gas removal port 185 is for the removal of driver gas, and driver gas make-up port 190 is for the intake of make-up gas for the driver section 160. The location of the various ports is not necessarily fixed. For example, in the illustrated embodiment, exhaust/injector ports 170 are located substantially at the midpoint of the cylinder. However, these ports may alternatively be located away from the midpoint adjacent the intake ports 180.

With further reference to FIG. 12 the engine 1000 further comprises a linear electromagnetic machine (LEM) 200 for directly converting the kinetic energy of the piston assembly 120 into electrical energy. LEM 200 is also capable of directly converting electrical energy into kinetic energy of the piston assembly 120 for providing compression work during a compression stroke. As illustrated, the LEM 200 comprises a stator 210 and a translator 220. Specifically, the translator 220 is attached to the piston rod 145 and moves linearly within the stator 210, which is stationary. The volume between the translator 220 and stator 210 is called the air gap. The LEM 200 may include any number of configurations. FIG. 6 shows one configuration in which the translator 220 is shorter than stator 210. However, the translator 220 could be longer than the stator 210, or they could be substantially the same length. In addition, the LEM 200 can be a permanent magnet machine, an induction machine, a switched reluctance machine, or some combination of the three. The stator 210 and translator 220 can each include magnets, coils, iron, or some combination thereof. Since the LEM 200 directly transforms the kinetic energy of the pistons to and from electrical energy (i.e., there are no mechanical linkages), the mechanical and frictional losses are minimal compared to conventional engine-generator configurations.

The embodiment shown in FIG. 12 operates using a two-stroke piston cycle. A diagram illustrating the two-stroke piston cycle 1250 of the single-piston integrated gas springs engine 1000 of FIG. 12 is illustrated in FIG. 13. The engine exhausts combustion products (though exhaust ports 170) and intakes air or an air/fuel mixture or an air/fuel/combustion products mixture (through intake ports 180) near BDC between the power and compression strokes. This process may be referred to herein as "breathing" or "breathing at or near BDC." It will be appreciated by those of ordinary skill in the art that many other types of port and breathing configurations are possible without departing from the scope of the invention. When at or near BDC, and if the driver section is to be used to provide compression work, the pressure of the gas within the driver section 160 is greater than the pressure of the combustion section 130, which forces the pistons 125 inwards toward each other. The gas in the driver section 160 can be used to provide at least some of the energy required to perform a compression stroke. The LEM 200 may also provide some of the energy required to perform a compression stroke.

The amount of energy required to perform a compression stroke depends on the desired compression ratio, the pressure of the combustion section 130 at the beginning of the compression stroke, and the mass of the piston assembly 120. A compression stroke continues until combustion occurs, which is at a time when the velocity of the piston 125 is at or near zero. The point at which the velocities of the piston 125 is equal to zero marks their TDC positions for that cycle. Combustion causes an increase in the temperature and pressure within the combustion section 130, which forces the piston 125 outward toward the LEM 200. During a power stroke, a portion of the kinetic energy of the piston assembly 120 is converted into electrical energy by the LEM 200 and another portion of the kinetic energy does compression work on the gas in the driver section 160. A power stroke continues until the velocities of the piston 125 is zero, which marks their BDC positions for that cycle.

FIG. 13 illustrates one port configuration 1300 for breathing in which the intake ports 180 are in front of the piston near BDC and the exhaust ports 170 are near TDC. The opening and closing of the exhaust ports 170 and intake ports 180 are independently controlled. The location of the exhaust ports 170 and intake ports 180 can be chosen such that a range of compression ratios and/or expansion ratios are possible. The times in a cycle when the exhaust ports 170 and intake ports 180 are activated (opened and closed) can be adjusted during and/or between cycles to vary the compression ratio and/or expansion ratio and/or the amount of combustion product retained in the combustion section 130 at the beginning of a compression stroke. Retaining combustion gases in the combustion section 130 is called residual gas trapping (RGT) and can be utilized to moderate combustion timing and peak temperatures.

During the piston cycle, gas could potentially transfer past the piston seals 135 between the combustion section 130 and driver section 160. This gas transfer is referred to as "blow-by." Blow-by gas could contain air and/or fuel and/or combustion products. The engine 1000 is designed to manage blow-by gas by having at least two ports in driver section 160—one port 185 for removing driver gas and the another port 190 for providing make-up driver gas. The removal of driver gas and the intake of make-up driver gas are independently controlled and occur in such a way to minimize losses and maximize efficiency.

FIG. 13 shows one strategy for exchanging driver gas in which the removal of driver gas occurs at some point during the expansion stroke and the intake of make-up driver gas occurs at some point during the compression stroke. The removal and intake of driver gas could also occur in the reverse order of strokes or during the same stroke. Removed driver gas can be used as part of the intake for the combustion section 130 during a proceeding combustion cycle. The amount of gas in the driver section 160 can be adjusted to vary the compression ratio and/or expansion ratio. The expansion ratio is defined as the ratio of the volume of combustion section 130 when the piston 125 has zero velocity after the power stroke to the volume of the combustion section 130 when the piston 125 has zero velocity after the compression stroke. The compression ratio is defined as the ratio of the volume of the combustion section 130 when the pressure within the combustion section 130 begins to increase due to the inward motion of the piston 125 to the ratio of the volume of the combustion section 130 when the piston 125 has zero velocity after the compression stroke.

The configuration of FIGS. 12 and 13 includes a single unit referred to as the engine 1000 and defined by the cylinder 105, the piston assembly 120 and the LEM 200. However, many units can be placed in parallel, which could collectively be referred to as "the engine." Some embodiments of the invention are modular such that they can be arranged to operate in parallel to enable the scale of the engine to be increased as needed by the end user. Additionally, not all units need be the same size or operate under the same conditions (e.g., frequency, stoichiometry, or breathing). When the units are operated in parallel, there exists the potential for integration between the engines, such as, but not limited to, gas exchange between the units and/or feedback between the units' LEM 200.

As stated, the embodiment described above with respect to FIGS. 12 and 13 comprises a single-piston, single-combustion section, two-stroke internal combustion engine 1000. Described below, and illustrated in the corresponding figures, are several alternative embodiments. These embodiments are not meant to be limiting. As would be appreciated by those of ordinary skill in the art, various modifications and alternative configurations may be utilized, and other changes may be made, without departing from the scope of the invention. Unless otherwise stated, the physical and operational characteristics of the embodiments described below are similar to those described in the embodiment of FIGS. 12 and 13, and like elements have been labeled accordingly. Furthermore, all embodiments may be configured in parallel (i.e., in multiple-unit configurations for scaling up) as set forth above.

FIG. 14 illustrates a four-stroke embodiment of the invention comprising a single piston, four-stroke, integrated gas springs engine 1400. The main physical difference between the four-stroke engine 1400 of FIG. 14 and the two-stroke engine 1000 of FIG. 12 involves the location of the ports. In particular, in the four-stroke engine 1400, the exhaust, injector, and intake ports 370 are located at and/or near the bottom of the cylinder 105 adjacent to the impact plate 230.

Figure 15:
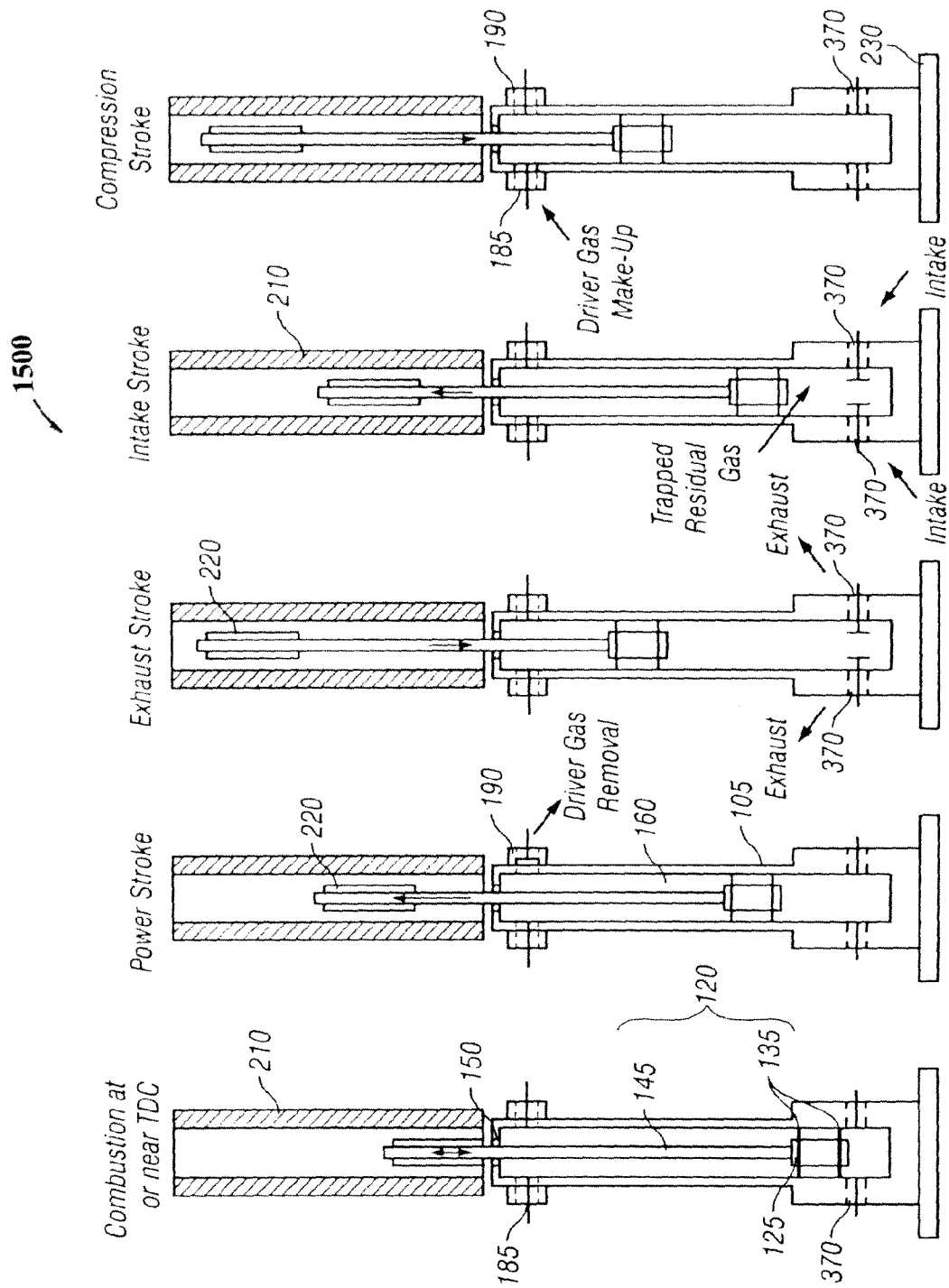
FIG. 15 is a diagram illustrating the four-stroke piston cycle of the single-piston, two-stroke, integrated gas springs engine of FIG. 14, in accordance with the principles of the invention.

FIG. 15 illustrates the four-stroke piston cycle 1500 for the single piston integrated gas springs engine 1400 of FIG. 14. A four-stroke piston cycle is characterized as having a power (expansion) stroke, an exhaust stroke, an intake stroke, and a compression stroke. A power stroke begins following combustion, which occurs at the optimal volume, and continues until the velocity of the piston 125 is zero, which marks the power-stroke BDC position for that cycle.

During a power stroke, a portion of the kinetic energy of the piston assembly 120 is converted into electrical energy by the LEM 200, and another portion of the kinetic energy does compression work on the gas in the driver section 160. When at and near the power-stroke BDC, and if the driver section is to provide at least some of the compression work, the pressure of the gas in the driver section 160 is greater than the pressure of the gas in the combustion section 130, which forces the piston 125 inwards toward the midpoint of the cylinder 105. In the illustrated embodiment, the gas in the driver section 160 can be used to provide at least some of the energy required to perform an exhaust stroke. In some cases, the LEM 200 may also provide some of the energy required to perform an exhaust stroke. Exhaust ports 370 open at some point at or near the power-stroke BDC, which can be before or after an exhaust stroke begins. An exhaust stroke continues until the velocity of the piston 125 is zero, which marks the exhaust-stroke TDC position for that cycle. Exhaust ports 370 close at some point before the piston 125 reaches its exhaust-stroke TDC position. Therefore, at least some combustion products remain in the combustion section 130. This process is referred to as residual gas trapping.

With further reference to FIG. 15, at and near the exhaust-stroke TDC, the pressure of the combustion section 130 is greater than the pressure of the driver section 160, which forces the piston 125 upwards. The trapped residual gas acts a gas spring to provide at least some of the energy required to perform an intake stroke. The LEM 200 may also provide some of the energy required to perform an intake stroke. Intake ports 370 open at some point during the intake stroke after the pressure within the combustion section 130 is below the pressure of the intake gas. An intake stroke continues until the velocity of the piston 125 is zero, which marks the intake-stroke BDC position for that cycle. The intake-stroke BDC position for a given cycle does not necessarily have to be the same as the power-stroke BDC position. Intake ports 370 close at some point at or near intake-stroke BDC. A compression stroke continues until combustion occurs, which is at a time when the velocity of the piston 125 is at or near zero. The position of the piston 125 at which its velocity equals zero marks its compression-stroke TDC position for that cycle. At and near the compression-stroke TDC, the pressure of the gas in the driver section 160 is greater than the pressure of the gas in the combustion section 130, which forces the piston 125 downwards. The gas in the driver section 160 is used to provide at least some of the energy required to perform a compression stroke. The LEM 200 may also provide some of the energy required to perform a compression stroke.

FIG. 15 shows one strategy for exchanging driver gas in which the removal of driver gas occurs at some point during the expansion stroke and the intake of make-up driver gas occurs at some point during the compression stroke. As in the two-stroke embodiment, the removal and intake of driver gas could also occur in the reverse order of strokes or during the same stroke. However, since the four-stroke embodiment has a separate exhaust stroke, which requires less energy to perform than a compression stroke, regulating the amount of air in the driver section 160 may require a different approach, depending on how much the LEM 200 is used to provide and extract energy during the four strokes.

FIG. 16 illustrates a second single piston, two-stroke, fully gas springs and integrated linear electromagnetic machine embodiment of an internal combustion engine 1600. Engine 1600 comprises a cylinder 105, piston assembly 520, and a combustion section 130. In the illustrated configuration, piston assembly 520 comprises two pistons 525, piston seals 535, and a piston rod 545. Unlike previous embodiments, the piston assembly 120 and translator 620 are completely located within the cylinder, and the LEM 600 (including stator 610) is disposed around the outside perimeter of the cylinder 105. The piston assembly 520 is free to move linearly within the cylinder 105. The cylinder 105 further includes exhaust/injector ports 170, intake ports 180, driver gas removal ports 185, and driver gas make-up ports 190. With further reference to FIG. 16, this embodiment can operate using a two- or four-stroke piston cycle using the same methodology set forth above.

FIG. 17 illustrates a third two-piston, two-stroke, single-combustion section, separated gas springs embodiment of an internal combustion engine 1700. Similar to engine 1000, engine 1700 comprises a main cylinder 105, piston assembly 120, and a combustion section 130. However, the illustrated engine 1700 has certain physical differences when compared with engine 1000. Specifically, engine 1700 includes outer cylinders 705 that contain additional piston 125, and the LEM 200 is disposed between the main cylinder 105 and the outer cylinder 705. Outer cylinder 705 includes a driver section 710 located between the piston 125 and the distal end of the cylinder 705 and a driver back section 720 disposed between the piston 135 and the proximal end of cylinder 705. Additionally, cylinder 105 includes a combustion back section 730 disposed between the piston 135 and the distal end of the cylinder 105. The driver back section 720 and combustion back section 730 are maintained at or near atmospheric pressure. As such, the driver back section 720 is not sealed (i.e., linear bearing 740 is provided with no gas seal), whereas the combustion back section 730 is sealed (i.e., via seal 150), but has ports for removal of blow-by gas (i.e., blow-by removal port 750) and for make-up gas (i.e., make-up air port 760). In the illustrated configuration, piston assembly 120 comprises two pistons 125, piston seals 135, and a piston rod 145. The piston assembly 120 is free to move linearly between the main cylinder 105 and the outer cylinder 705. The piston rod 145 moves along bearings and is sealed by gas seals 150 that are fixed to the main cylinder 105. The cylinder 105 further includes exhaust/injector ports 170 and intake ports 180. However, the driver gas removal ports 185 and driver gas make-up ports 190 are located on outer cylinder 705 that contains one of the two pistons 125 of the piston assembly 120. This embodiment can operate using a two- or four-stroke piston cycle using the same methodology set forth above.

Figure 18:
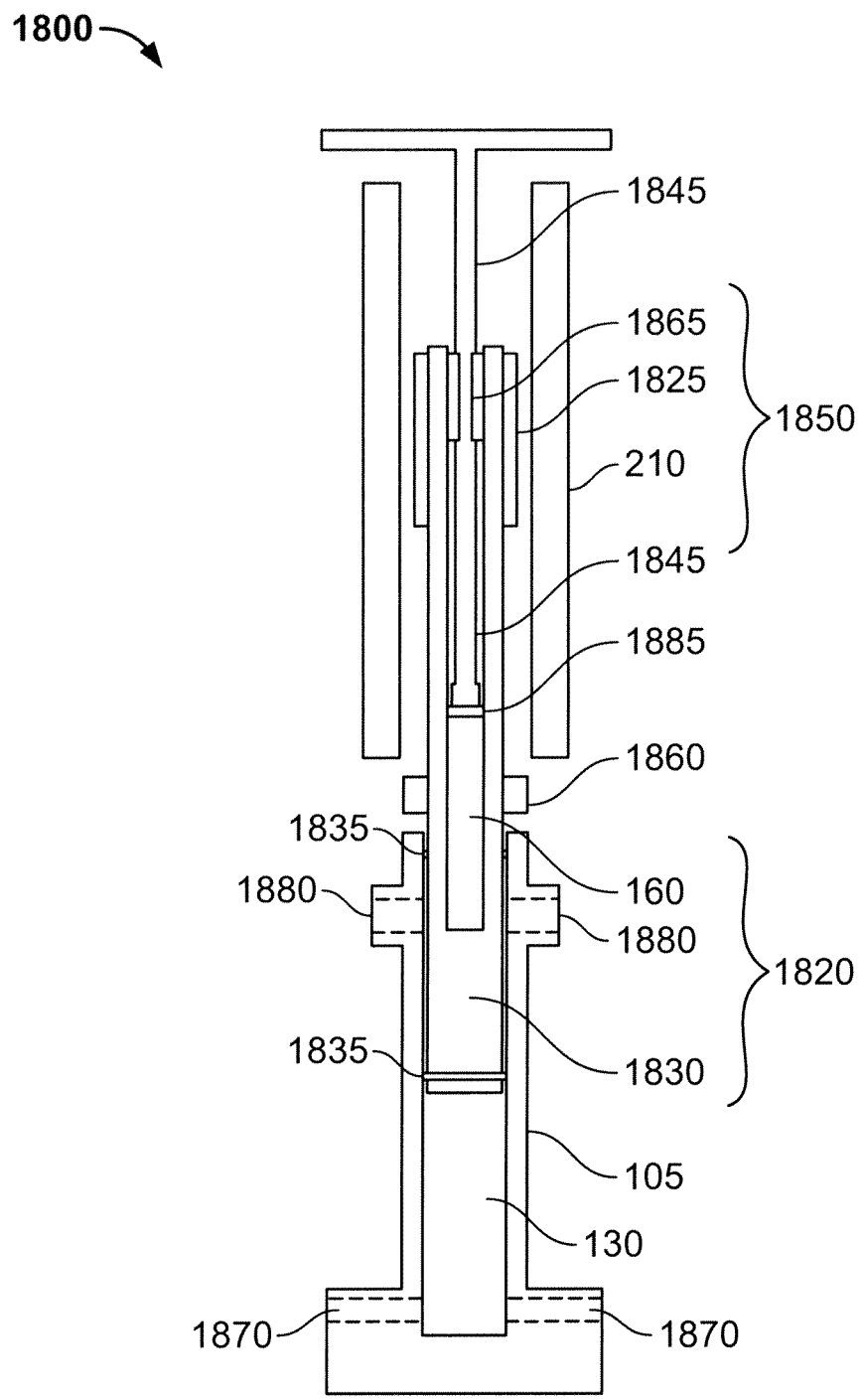
FIG. 18 is a cross-sectional view illustrating a single-piston, two-stroke version of the IIGS architecture in accordance with an embodiment of the invention.

The embodiments disclosed above comprise single-piston and two-piston configurations, including: (i) an integrated gas spring with a separated linear electromagnetic machine (FIGS. 6-9 and 12-15), (ii) a fully integrated gas spring and linear electromagnetic machine (FIGS. 10 and 16), and (iii) a separated gas spring and linear electromagnetic machine (FIGS. 11 and 17). FIGS. 18-20 illustrate further embodiments of the invention featuring integrated internal gas springs in which the gas spring is integrated inside of the piston and the linear electromagnetic (LEM) is separated from the combustor cylinder. Table 1 summarizes the key distinctions between the four architectures described herein including.

TABLE 1

Summary of the key distinctions between the four architectures.

| Architecture | Length of a Single-Piston Engine (Combustion Section + Driver Section + LEM) | Blow-by Location |
|---|---|---|
| Integrated Gas Spring, Separated LEM | ~2x the stroke | Into gas spring |
| Fully Integrated Gas Spring and LEM | Slightly larger than the stroke | Into gas spring |
| Separated Gas Spring and LEM | ~3x the stroke | Not into gas spring |
| Integrated Internal Gas Spring, Separate LEM | ~2x the stroke | Not into gas spring |

Integrated Internal Gas Spring

As illustrated in FIGS. 18-20 and summarized in Table 1, the integrated internal gas spring (IIGS) architecture is similar in length to the integrated gas spring with separated LEM architecture illustrated in FIGS. 6-9 and 12-15. However, the IIGS architecture eliminates the issues with respect to the blow-by gases from the combustion section entering the gas spring, which also occurs in the fully integrated gas spring and LEM architecture.

FIG. 18 is a cross-sectional view illustrating a single-piston, two-stroke version of the IIGS architecture in accordance with an embodiment of the invention. Many components such as the combustion section 130 are similar to the components in previous embodiments (e.g., FIG. 12), and are labeled accordingly. The engine 1800 comprises a vertically disposed cylinder 105 with piston assembly 1820 dimensioned to move within the cylinder 105 in response to reactions within combustion section 130 near the bottom end of the cylinder 105. An impact plate may be provided at the bottom end of the vertically disposed cylinder to provide stability and impact resistance during combustion. Piston assembly 1820 comprises a piston 1830, piston seals 1835, and a spring rod 1845. The piston assembly 1820 is free to move linearly within the cylinder 105. The piston rod 1845 moves along bearings and is sealed by gas seals 150 that are fixed to the cylinder 105. In the illustrated embodiment, the gas seals 150 are piston rod seals. The cylinder 105 includes exhaust/injector ports 1870, 1880 for intake of air, fuel, exhaust gases, air/fuel mixtures, and/or air/exhaust gases/fuel mixtures, exhaust of combustion products, and/or injectors. Some embodiments do not require all of the ports depicted in FIG. 18. The number and types of ports depends on the engine configuration, injection strategy, and piston cycle (e.g., two- or four-stroke piston cycles).

In the illustrated embodiment, the engine 1800 further comprises an LEM 1850 (including stator 210 and magnets 1825) for directly converting the kinetic energy of the piston assembly 1820 into electrical energy. LEM 1850 is also capable of directly converting electrical energy into kinetic energy of the piston assembly 1820 for providing compression work during a compression stroke. The LEM 1850 can be a permanent magnet machine, an induction machine, a switched reluctance machine, or some combination of the three. The stator 210 can include magnets, coils, iron, or some combination thereof. Since the LEM 1850 directly transforms the kinetic energy of the pistons to and from electrical energy (i.e., there are no mechanical linkages), the mechanical and frictional losses are minimal compared to conventional engine-generator configurations.

With further reference to FIG. 18, the piston 1830 comprises a solid front section (combustor side) and a hollow back section (gas spring side). The area inside of the hollow section of the piston 1830, between the front face of the piston and spring rod 1845, comprises a gas that serves as the gas spring 160, which provides at least some of the work required to perform a compression stroke. The piston 1830 moves linearly within the combustor section 130 and the stator 210 of the LEM 1850. The piston's motion is guided by bearings 1860, 1865, which may be solid bearings, hydraulic bearings, and/or air bearings. In the illustrated embodiment, the engine 1800 includes both external bearings 1860 and internal bearings 1865. In particular, the external bearings 1860 are located between the combustion section 130 and the LEM 1850, and the internal bearings 1865 are located on the inside of the hollow section of the piston 1830. The external bearings 1860 are externally fixed and do not move with the piston 1830. The internal bearings 1865 are fixed to the piston 1830 and move with the piston 1830 against the spring rod 1845.

With continued reference to FIG. 18, the spring rod 1845 serves as one face for the gas spring 160 and is externally fixed. The spring rod 1845 has at least one seal 1885 located at or near its end, which serves the purpose of keeping gas within the gas spring section 160. Magnets 1825 are attached to the back of the piston 1830 and move linearly with the piston 1830 within the stator 210 of the LEM 1850. The piston 1830 has seals 1835 to keep gases in the respective sections. The illustrated embodiment includes (i) front seals that are fixed to the piston 1830 at or near its front end to keep to gases from being transferred from the combustion section 130, and (ii) back seals that are fixed to the cylinder 105 and keep intake gases and/or blow-by gases from being transferred to the surroundings.

FIG. 19 is a cross-sectional view illustrating an embodiment 1900 of a gas spring rod 1845 in accordance with the principles of the invention. Specifically, the spring rod 1845 includes a central lumen 1910 that allows mass to be transferred between the gas spring section 160 to a reservoir section 1920 that is in communication with the surroundings. The communication with the surroundings is controlled through a valve 1930. The amount of mass in the gas spring 1845 is regulated to control the pressure within the gas spring 1845 such that sufficient compression work is available for the next piston cycle.

FIG. 20 is a cross-sectional view illustrating a two-piston, two-stroke version of the IIGS engine 2000 in accordance with an embodiment of the invention. Most of the elements of the two-piston embodiment are similar to those of the single-piston embodiment of FIG. 18, and like elements are labeled accordingly. In addition, the operating characteristics of the single- and two-piston embodiments are similar as described in previous embodiments, including all the aspects of the linear alternator, breathing, combustion strategies, etc.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly;
a pair of driver sections, each driver section comprising a compression mechanism that directly provides at least some compression work during a compression stroke of the engine; and
a pair of linear electromagnetic machines adapted to directly convert kinetic energy of the piston assembly into electrical energy, and adapted to directly convert electrical energy into kinetic energy of the piston assembly for providing compression work during the compression stroke, wherein each linear electromagnetic machine is located distal to an end of the cylinder, wherein a length of the combustion section at top-dead-center is between 0.2 inches and 4 inches.

2. The linear combustion engine of claim 1, wherein the engine includes a variable compression ratio less than or equal to the variable expansion ratio.

3. The linear combustion engine of claim 1, wherein:
each piston assembly comprises a piston, piston seals, and a piston rod; and
the piston rods move linearly internal and external of the cylinder along bearings and are sealed by gas seals that are fixed to the cylinder.

4. The linear combustion engine of claim 1, wherein:
each piston assembly comprises two pistons, piston seals, and a piston rod; and
each piston assembly is encapsulated by the cylinder and configured to move linearly within the cylinder.

5. The linear combustion engine of claim 1, wherein each linear electromagnetic machine comprises a stator and a translator that is attached to a piston assembly and moves linearly within the stator.

6. The linear combustion engine of claim 1, wherein each linear electromagnetic machine comprises a permanent magnet machine, an induction machine, a switched reluctance machine, or a combination thereof.

7. The linear combustion engine of claim 1, wherein the compression mechanism comprises a linear alternator operated as a motor or a gas spring comprising a volume of gas located in the driver section in communication with the piston assembly.

8. The linear combustion engine of claim 1, wherein:
fuel is directly injected into the combustion section via fuel injectors or is mixed with air prior to or during air intake; and
the engine is capable of operation with lean, stoichiometric, or rich combustion using liquid or gaseous fuels.

9. The linear combustion engine of claim 1, further comprising:
one or more exhaust/injector ports that allow exhaust gases and fluids to enter and leave the cylinder;
one or more intake ports that allow the intake of air or air/fuel mixtures or air/fuel/combustion product mixtures;
one or more driver removal ports that allow for the removal of driver gas; and
one or more driver make-up ports that allow for the intake of make-up gas for the driver section.

10. The linear combustion engine of claim 1, wherein the engine operates using a two-stroke piston cycle including a power stroke and a compression stroke.

11. The linear combustion engine of claim 1, wherein the engine exhausts combustion products and intakes air or an air/fuel mixture or an air/fuel/combustion products mixture near bottom-dead-center between a power stroke and the compression stroke.

12. The linear combustion engine of claim 1, wherein during a power stroke, a portion of the kinetic energy of the piston assembly is converted into electrical energy by the linear electromagnetic machine and another portion of the kinetic energy does compression work on gas in the driver section.

13. The linear combustion engine of claim 1, wherein the engine operates using a four-stroke piston cycle including an intake stroke, a compression stroke, a power stroke, and an exhaust stroke.

14. The linear combustion engine of claim 13, wherein during the power stroke, a portion of the kinetic energy of the piston assembly is converted into electrical energy by the linear electromagnetic machine and another portion of the kinetic energy does compression work on gas in the driver section.

15. The linear combustion engine of claim 13, wherein the exhaust stroke continues until all exhaust ports close and the velocities of the pistons are zero, such that at least some combustion products remain in the combustion section.

16. The linear combustion engine of claim 13, wherein the intake stroke continues until the velocities of the pistons are zero and all intake ports close.

17. The linear combustion engine of claim 1, wherein:
engine ignition is achieved via spark or compression ignition; and
optimal combustion is achieved by moderating the gas temperature within the combustion section such that it reaches its auto-ignition temperature at its optimal volume.

18. The linear combustion engine of claim 1, wherein the cylinder comprises a main cylinder portion that houses the combustion section and a pair of outer cylinder portions located on either side of the main cylinder, each outer cylinder portion housing a driver section.

19. The linear combustion engine of claim 1, wherein the cylinder houses the combustion section and the driver sections.

20. The linear combustion engine of claim 1, wherein the driver section provides at least some compression work during a compression stroke.

21. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly;
a pair of driver sections, each driver section comprising compression mechanism that directly provides at least some compression work during a compression stroke of the engine; and
a pair of linear electromagnetic machines adapted to directly convert kinetic energy of the piston assembly into electrical energy, and adapted to directly convert electrical energy into kinetic energy of the piston assembly for providing compression work during the compression stroke, wherein each linear electromagnetic machine is located distal to an end of the cylinder, wherein the engine includes a variable expansion ratio greater than 50:1.

22. The linear combustion engine of claim 21, wherein the engine includes a variable expansion ratio greater than 75:1.

23. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein the driver section comprises a hollow back section including a gas spring that directly provides at least some compression work during the compression stroke.

24. The linear combustion engine of claim 23, wherein the piston assembly further comprises external bearings located between the combustion section and the linear electromagnetic machines, and internal bearings located within the hollow section of the piston.

25. The linear combustion engine of claim 23, wherein one end of the spring rod comprises a face of the spring.

26. The linear combustion engine of claim 23, wherein the spring rod includes a central lumen that allows mass to be transferred between the driver section to a reservoir section that is in communication with the surroundings.

27. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein the piston assembly further comprises magnets attached to the piston that move linearly with the piston within a stator of the linear electromagnetic machine.

28. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein the piston assembly further comprises front seals that are fixed to the piston at or near its front end to keep to gases from being transferred from the combustion section, and back seals that are fixed to the cylinder and keep intake gases or blow-by gases from being transferred to the surroundings.

29. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein a length of the combustion section at top-dead-center is between 0.2" and 4".

30. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein the engine includes a variable compression ratio less than or equal to the variable expansion ratio.

31. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein the engine includes a variable expansion ratio greater than 50:1.

32. The linear combustion engine of claim 31 wherein the engine includes a variable expansion ratio greater than 75:1.

33. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein each linear electromagnetic machine comprises a permanent magnet machine, an induction machine, a switched reluctance machine, or a combination thereof.

34. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein:
fuel is directly injected into the combustion section via fuel injectors or is mixed with air prior to or during air intake, and
the engine is capable of operation with lean, stoichiometric, or rich combustion using liquid or gaseous fuels.

35. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section;
a pair of linear electromagnetic machines adapted to directly convert kinetic energy of the piston assembly into electrical energy, and adapted to directly convert electrical energy into kinetic energy of the piston assembly for providing compression work during a compression stroke of the engine;
one or more exhaust/injector ports that allow exhaust gases and fluids to enter and leave the cylinder;
one or more intake ports that allow the intake of air or air/fuel mixtures or air/fuel/combustion product mixtures;
one or more driver gas removal ports that allow for the removal of driver gas; and
one or more driver gas make-up ports that allow for the intake of make-up as for the driver section.

36. A linear combustion engine, comprising:
a cylinder having a cylinder wall and a pair of ends, the cylinder including a combustion section disposed in a center portion of the cylinder;
a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein the engine operates using a two-stroke piston cycle including a power stroke and the compression stroke.

37. The linear combustion engine of claim 36, wherein the engine exhausts combustion products and intakes air or an air/fuel mixture or an air/fuel/combustion products mixture near bottom-dead-center between the power and compression strokes.

38. The linear combustion engine of claim 36, wherein during the power stroke, a portion of the kinetic energy of the piston assembly is converted into electrical energy by the linear electromagnetic machine and another portion of the kinetic energy does compression work on gas in the driver section.

39. A linear combustion engine, comprising:
- a cylinder having a cylinder wall and a pair of ends, the cylinder including a combustion section disposed in a center portion of the cylinder;
- a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
- a pair of linear electromagnetic machines adapted to directly convert kinetic energy of the piston assembly into electrical energy, and adapted to directly convert electrical energy into kinetic energy of the piston assembly for providing compression work during a compression stroke of the engine, wherein the engine operates using a four-stroke piston cycle including an intake stroke, the compression stroke, a power stroke, and an exhaust stroke.

40. The linear combustion engine of claim 39, wherein during the power stroke, a portion of the kinetic energy of the piston assembly is converted into electrical energy by the linear electromagnetic machine and another portion of the kinetic energy does compression work on gas in the driver section.

41. The linear combustion engine of claim 39, wherein the exhaust stroke continues until all exhaust ports close and the velocities of the pistons are zero, such that at least some combustion products remain in the combustion section.

42. The linear combustion engine of claim 39, wherein the intake stroke continues until the velocities of the pistons are zero and all intake ports close.

43. A linear combustion engine, comprising:
- a cylinder having a cylinder wall and a pair of ends, the cylinder including a combustion section disposed in a center portion of the cylinder;
- a pair of opposed piston assemblies adapted to move linearly within the cylinder, each piston assembly disposed on one side of the combustion section opposite the other piston assembly, each piston assembly including a spring rod and a piston comprising a solid front section adjacent the combustion section and a driver section; and
- a pair of linear electromagnetic machines adapted to directly convert kinetic energy of the piston assembly into electrical energy and adapted to direct convert electrical energy into kinetic energy of the piston assembly for providing compression work during a compression stroke of the engine, wherein:
engine ignition is achieved via spark or compression ignition, and
optimal combustion is achieved by moderating the gas temperature within the combustion section such that it reaches its auto-ignition temperature at its optimal volume.

* * * * *